United States Patent
Xiao et al.

(10) Patent No.: US 11,483,197 B2
(45) Date of Patent: *Oct. 25, 2022

(54) FAULT LOCALIZATION METHOD AND DEVICE

(71) Applicant: Huawei Technologies Co., Ltd., Shenzhen (CN)

(72) Inventors: Xin Xiao, Nanjing (CN); Li Xue, Nanjing (CN); Ruihong Wang, Dongguan (CN); Qiang Wang, Shenzhen (CN); Ping Huang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/497,088

(22) Filed: Oct. 8, 2021

(65) Prior Publication Data

US 2022/0060372 A1   Feb. 24, 2022

Related U.S. Application Data

(63) Continuation of application No. 16/774,599, filed on Jan. 28, 2020, now Pat. No. 11,159,363, which is a (Continued)

(30) Foreign Application Priority Data

Jul. 31, 2017   (CN) .......................... 201710643337.8

(51) Int. Cl.
*H04L 41/0677* (2022.01)
*H04L 41/5009* (2022.01)
(Continued)

(52) U.S. Cl.
CPC ...... *H04L 41/0677* (2013.01); *H04L 41/5009* (2013.01); *H04L 41/5025* (2013.01); *H04L 41/5067* (2013.01)

(58) Field of Classification Search
None
See application file for complete search history.

(56) References Cited

U.S. PATENT DOCUMENTS

| 7,319,691 B2 | 1/2008 | Qing et al. |
| 8,452,871 B2 | 5/2013 | Ge et al. |
| (Continued) | | |

FOREIGN PATENT DOCUMENTS

| CN | 101789899 A | 7/2010 |
| CN | 102143389 A | 8/2011 |
| (Continued) | | |

OTHER PUBLICATIONS

Huawei Tech Co Ltd, "Y. INADF: Framework for Intelligent Network Analytics and Diagnostics," SG12-C.53 R1, Study Group 12, Geneva, Jan. 10-19, 2017, 20 pages.
(Continued)

*Primary Examiner* — Ranodhi Serrao
(74) *Attorney, Agent, or Firm* — Conley Rose, P.C.

(57) ABSTRACT

A fault localization method includes: obtaining user experience data, network topology data, and resource management data that are of a video service; where the network topology data is used to represent a connection relationship between network devices, and the resource management data is used to represent a connection relationship between user equipment and the network devices; determining a QoE experience indicator of a network device based on the user experience data, the network topology data, and the resource management data; and when QoE represented by the QoE experience indicator of the network device is lower than
(Continued)

QoE represented by a device screening threshold, determining the network device as a possible questionable device.

20 Claims, 23 Drawing Sheets

Related U.S. Application Data continuation of application No. PCT/CN2018/085314, filed on May 2, 2018.

(51) Int. Cl.
*H04L 41/5025* (2022.01)
*H04L 41/5067* (2022.01)

(56) References Cited

U.S. PATENT DOCUMENTS

| | | | |
|---|---|---|---|
| 8,576,273 B2 | 11/2013 | Li et al. | |
| 8,826,314 B2 | 9/2014 | Wang et al. | |
| 8,924,033 B2 | 12/2014 | Goutard et al. | |
| 8,934,352 B2 | 1/2015 | Pei et al. | |
| 8,984,116 B2* | 3/2015 | Ge | H04L 43/04 709/223 |
| 9,113,345 B2 | 8/2015 | Griff et al. | |
| 9,262,253 B2 | 2/2016 | Jain et al. | |
| 9,264,331 B2 | 2/2016 | Pei et al. | |
| 2013/0054783 A1* | 2/2013 | Ge | H04L 43/0823 709/224 |
| 2014/0043983 A1* | 2/2014 | Huang | H04W 24/08 370/244 |
| 2014/0139688 A1 | 5/2014 | Yu et al. | |
| 2014/0229614 A1* | 8/2014 | Aggarwal | H04L 65/1063 709/224 |
| 2015/0085675 A1* | 3/2015 | Pei | H04L 41/0677 370/242 |
| 2016/0087856 A1* | 3/2016 | Groenendijk | H04L 43/091 370/242 |
| 2016/0149783 A1* | 5/2016 | Pei | H04L 43/0823 370/242 |
| 2018/0048527 A1* | 2/2018 | Ganjam | H04L 41/5067 |

FOREIGN PATENT DOCUMENTS

| | | |
|---|---|---|
| CN | 102291267 A | 12/2011 |
| CN | 102523291 A | 6/2012 |
| CN | 102710453 A | 10/2012 |
| CN | 102790699 A | 11/2012 |
| CN | 104469540 A | 3/2015 |
| CN | 104683998 A | 6/2015 |
| CN | 103036707 B | 3/2016 |
| CN | 109150569 A | 1/2019 |
| EP | 2244426 A1 | 10/2010 |
| WO | 2012119392 A1 | 9/2012 |
| WO | 2014040646 A1 | 3/2014 |

OTHER PUBLICATIONS

Zhu, G., "Design and Implementation of IPTV Service Analysis System", 2017, 69 pages.

* cited by examiner

FAULT LOCALIZATION METHOD AND DEVICE

CROSS-REFERENCE TO RELATED APPLICATIONS

This is a continuation of U.S. patent application Ser. No. 16/774,599 filed on Jan. 28, 2020, which is a continuation of Int'l Patent App. No. PCT/CN2018/085314 filed on May 2, 2018, which claims priority to Chinese Patent App. No. 201710643337.8 filed on Jul. 31, 2017, all of which are incorporated by reference.

FIELD

The present disclosure relates to the computer field, and in particular, to a fault localization method and device.

BACKGROUND

With rapid development of the network video industry, for example, emergence of Internet Protocol television (IPTV) services and over-the-top (OTT) services, operators have gradually shifted their focus from network coverage and network quality assurance to "user-centric" operations, especially focus on user experience. Quality of user experience is directly related to user market share, and improving the video user experience can further promote service growth. In an IPTV system, if a network device or link is faulty, for example, a port, subcard, or board of the device is faulty, IPTV users will be directly affected, and user experience is greatly affected. Therefore, when the network device is faulty and the user experience deteriorates, the faulty device needs to be accurately located in time, and the fault is rectified in time to ensure good user experience.

At present, in the IPTV field, an emergency manner in which a user complains a trouble ticket to reflect an experience problem, to trigger a maintenance department to manually troubleshoot a fault is usually used. However, manual fault localization is excessively delayed, the user is affected for a long time, and operations are complicated.

For this disadvantage, a faulty device can be located by monitoring a network quality of service (QoS) indicator (for example, a packet loss rate or a delay) and giving an alarm if each QoS indicator exceeds an alarm threshold. However, because a QoS exception may not cause deterioration of final user experience, and a device with the QoS exception may not be the faulty device that causes the exception, accuracy of fault localization is low.

SUMMARY

Embodiments of the present disclosure provide a fault localization method and device, and accuracy of fault localization is high.

According to a first aspect, a fault localization method is provided. The method includes: obtaining user experience data, network topology data, and resource management data that are of a video service, where the network topology data is used to represent a connection relationship between network devices, and the resource management data is used to represent a connection relationship between user equipment and the network devices; determining a quality of experience (QoE) experience indicator of a network device based on the user experience data, the network topology data, and the resource management data, where the QoE experience indicator of the network device are determined based on user experience data of user equipment served by the network device; and when QoE represented by the QoE experience indicator of the network device is lower than QoE represented by a device screening threshold, determining the network device as a possible questionable device.

In this embodiment of the present disclosure, the user experience data, the network topology data, and the resource management data that are of the video service are obtained, so that the QoE experience indicator of the network device can be determined. The QoE experience indicator of the network device is determined based on the user experience data of the user equipment served by the network device. This is different from a manner in which a QoS indicator of the network device is directly determined by obtaining a parameter of the network device. Therefore, compared with a method for performing fault localization by monitoring the QoS indicator, this method can better reflect user experience and has higher accuracy.

In a possible implementation, the user experience data includes at least one of the following items: a video mean opinion score (vMOS), stalling duration, a stalling proportion, stalling frequency, a blockiness duration proportion, blockiness times, a blockiness area proportion, video quality switch times, and a poor quality proportion of video quality. According to this implementation, the QoE experience indicator of the network device can be determined with reference to one or more of the foregoing items.

In a possible implementation, the network topology data includes a topology connection relationship or a service path of an existing network, and the service path is used to represent a connection relationship between the network devices through which service traffic flows. According to this implementation, the user equipment served by the network device may be determined based on the topology connection relationship or the service path of the existing network, so that the QoE experience indicator of the network device may be determined based on the obtained user experience data.

In a possible implementation, a distribution characteristic of the QoE experience indicators of a plurality of same hierarchy network devices including the possible questionable device are analyzed, and a network device whose QoE experience indicator is an outlier and that is in the plurality of same hierarchy network devices is determined as a questionable device when it is determined, based on the distribution characteristic, that the QoE experience indicators of the plurality of same hierarchy network devices are in skewed distribution. According to this implementation, statistics and analysis are performed on the distribution characteristic of the QoE experience indicators of the plurality of same hierarchy network devices including the possible questionable device, to determine the questionable device, so that accuracy of fault localization can be further improved.

In a possible implementation, a first distribution characteristic value of the QoE experience indicators of the plurality of same hierarchy network devices including the possible questionable device is determined, where the first distribution characteristic value is used to represent whether the QoE experience indicators of the plurality of same hierarchy network devices are in skewed distribution; when the first distribution characteristic value is greater than a first equilibrium skew threshold, it is determined that the QoE experience indicators of the plurality of same hierarchy network devices are in skewed distribution; and the network device whose QoE experience indicator is the outlier and that is in the plurality of same hierarchy network devices is determined as the questionable device. According to this implementation, by using a value relationship between the first distribution characteristic value and the first equilibrium skew threshold, it is determined that the QoE experience indicators of the plurality of same hierarchy network devices are in skewed distribution, so as to determine the questionable device. This manner has high accuracy. Optionally, the first distribution characteristic value is a coefficient of variation.

In a possible implementation, a first overall characteristic value of the QoE experience indicators of the plurality of same hierarchy network devices including the possible questionable device is determined, where the first overall characteristic value is used to represent an average level of the QoE experience indicators of the plurality of same hierarchy network devices; and the distribution characteristic of the QoE experience indicators of the plurality of same hierarchy network devices including the possible questionable device are analyzed, and a network device whose QoE experience indicator is greater than the first overall characteristic value and that is in the plurality of same hierarchy network devices is determined as the questionable device when it is determined, based on the distribution characteristic, that the QoE experience indicators of the plurality of same hierarchy network devices are in skewed distribution. According to this implementation, the first overall characteristic value is determined and the QoE experience indicators of the plurality of same hierarchy network devices are compared with the first overall characteristic value, so that a network device whose QoE experience indicator is an outlier and that is in the plurality of same hierarchy network devices is determined, and the network device is determined as the questionable device. This manner has high accuracy. Optionally, the first overall characteristic value is an average value or a median or an empirically set value used to represent an average level. The foregoing average value may be a direct average value or a weighted average value. For example, when a quantity of users served by the network device is large, a weighting coefficient of the QoE experience indicator of the network device is large.

Optionally, after the questionable device is initially determined based on the foregoing manner, the questionable device may further be determined in the following manner: A lower confidence limit of a quantity of online users of the plurality of same hierarchy network devices is determined; and the questionable device is excluded when a quantity of online users of the questionable device is less than the lower confidence limit. In other words, a network device that has excessively few online users and that is in the initially determined questionable device is not considered as a questionable device. This manner can further improve accuracy of fault localization.

In a possible implementation, when it is determined that the QoE experience indicators of the plurality of same hierarchy network devices are not in skewed distribution and that the first overall characteristic value is greater than a first empirical threshold, it is determined that there is a possible questionable device in at least one upstream network device of the plurality of same hierarchy network devices. According to this implementation, a possible questionable device in network devices in a hierarchy in the network may be first analyzed by using the value relationship between the QoE experience indicator of the network device and the device screening threshold, and then whether there is a possible questionable device in the at least one upstream network device is determined based on the distribution characteristic of the QoE experience indicators of the network device in this hierarchy. This manner has a relatively low amount of operation and can save processing resources.

In a possible implementation, a second overall characteristic value of the QoE experience indicators of a plurality of same hierarchy lower-hierarchy network devices of the questionable device is determined, where the second overall characteristic value is used to represent an average level of the QoE experience indicators of the plurality of same hierarchy lower-hierarchy network devices; and the questionable device is not excluded when it is determined that the QoE experience indicators of the plurality of same hierarchy lower-hierarchy network devices of the questionable device are not in skewed distribution and that the second overall characteristic value is greater than a second empirical threshold. According to this implementation, after the questionable device is initially determined, the distribution characteristic of the QoE experience indicators of the plurality of same hierarchy lower-hierarchy network devices of the questionable device can further be analyzed, to further determine the questionable device or exclude the questionable device. This manner can improve accuracy of determining the questionable device. Optionally, the second overall characteristic value is an average value or a median or an empirically set value used to represent an average level. The foregoing average value may be a direct average value or a weighted average value. For example, when a quantity of users served by the network device is large, a weighting coefficient of the QoE experience indicator of the network device is large.

In a possible implementation, the questionable device includes a plurality of device internal units in at least one hierarchy, the distribution characteristic of the QoE experience indicators of a plurality of same hierarchy device internal units of the questionable device are analyzed, and a device internal unit whose QoE experience indicator is an outlier and that is in the plurality of same hierarchy device internal units is determined as a questionable unit when it is determined, based on the distribution characteristic, that the QoE experience indicators of the plurality of same hierarchy device internal units are in skewed distribution. According to this implementation, after the questionable device is determined, the distribution characteristic of the QoE experience indicators of the plurality of same hierarchy device internal units of the questionable device can be further analyzed, to determine the questionable unit. This manner can further improve accuracy of fault localization.

In a possible implementation, a third overall characteristic value of the QoE experience indicators of the plurality of same hierarchy device internal units of the questionable device is determined, where the third overall characteristic value is used to represent an average level of the QoE experience indicators of the plurality of same hierarchy device internal units; and when it is determined that the QoE experience indicators of the plurality of same hierarchy device internal units are not in skewed distribution and that the third overall characteristic value is greater than a third empirical threshold, it is determined that there is a questionable unit in at least one upper-hierarchy device internal unit of the plurality of same hierarchy device internal units. According to this implementation, after the questionable device is determined, whether there is a questionable unit in the same hierarchy upper-hierarchy device internal units can be determined based on the distribution characteristic of the QoE experience indicators of the plurality of same hierarchy device internal units of the questionable device. In this manner, it is not necessary to analyze the distribution characteristic of the QoE experience indicators of the device internal units in each hierarchy. Therefore, this manner has a relatively low amount of operation and can save processing resources. Optionally, the third overall characteristic value is an average value or a median or an empirically set value used to represent an average level. The foregoing average value may be a direct average value or a weighted average value. For example, when a quantity of users served by the device internal unit is large, a weighting coefficient of the QoE experience indicator of the device internal unit is large.

Optionally, a lower confidence limit of a quantity of online users of the plurality of same hierarchy device internal units is determined; and when the quantity of online users of the questionable unit is less than the lower confidence limit, the questionable unit is excluded. In other words, a device internal unit that has excessively few online users and that is in the initially determined questionable unit is not considered as a questionable unit. This manner can further improve accuracy of fault localization.

In a possible implementation, a fourth overall characteristic value of the QoE experience indicators of a plurality of same hierarchy lower-hierarchy device internal units of the questionable unit is determined; and the questionable unit is not excluded when it is determined that the QoE experience indicators of the plurality of same hierarchy lower-hierarchy device internal units are not in skewed distribution and that the fourth overall characteristic value is greater than a fourth empirical threshold. According to this implementation, the questionable unit is further determined by analyzing the distribution characteristic of the QoE experience indicators of the plurality of same hierarchy lower-hierarchy device internal units of the questionable unit, thereby helping improve accuracy of fault localization. Optionally, the fourth overall characteristic value is an average value or a median or an empirically set value used to represent an average level. The foregoing average value may be a direct average value or a weighted average value. For example, when a quantity of users served by the device internal unit is large, a weighting coefficient of the QoE experience indicator of the device internal unit is large.

Optionally, a second distribution characteristic value of the QoE experience indicators of the plurality of same hierarchy device internal units is determined, where the second distribution characteristic value is used to represent whether the QoE experience indicators of the plurality of same hierarchy device internal units are in skewed distribution; when the second distribution characteristic value is greater than a second equilibrium skew threshold, it is determined that the QoE experience indicators of the plurality of same hierarchy device internal units are in skewed distribution; and a device internal unit whose QoE experience indicator is an outlier and that is in the plurality of same hierarchy device internal units is determined as the questionable unit. According to this implementation, by using a value relationship between the second distribution characteristic value and the second equilibrium skew threshold, it is determined that the QoE experience indicators of the plurality of same hierarchy device internal units are in skewed distribution, so as to determine the questionable unit. This manner has high accuracy. Optionally, the second distribution characteristic value is a coefficient of variation.

Optionally, a fifth overall characteristic value of the QoE experience indicators of the plurality of same hierarchy device internal units is determined, where the fifth overall characteristic value is used to represent an average level of the QoE experience indicators of the plurality of same hierarchy device internal units; and a distribution characteristic of the QoE experience indicators of the plurality of same hierarchy device internal units are analyzed, and a device internal unit whose QoE experience indicator is greater than the fifth overall characteristic value and that is in the plurality of same hierarchy device internal units is determined as a questionable unit when it is determined, based on the distribution characteristic, that the QoE experience indicators of the plurality of same hierarchy device internal units are in skewed distribution. According to this implementation, the fifth overall characteristic value is determined and the QoE experience indicators of the plurality of same hierarchy device internal units are compared with the fifth overall characteristic value, so that a device internal unit whose QoE experience indicator is the outlier and that is in the plurality of same hierarchy device internal units is determined, and the device internal unit is determined as a questionable unit. This manner has high accuracy. Optionally, the fifth overall characteristic value is an average value or a median or an empirically set value used to represent an average level. The foregoing average value may be a direct average value or a weighted average value. For example, when a quantity of users served by the device internal unit is large, a weighting coefficient of the QoE experience indicator of the device internal unit is large.

In a possible implementation, the QoE experience indicators of a plurality of lower-hierarchy devices of the questionable device are clustered, where each cluster includes at least one QoE experience indicator; a proportion of a cluster including a largest quantity of QoE experience indicators in a total quantity of the QoE experience indicators of the plurality of lower-hierarchy devices is determined as a first similarity aggregation degree of the QoE experience indicators of the plurality of lower-hierarchy devices of the questionable device; and when the first similarity aggregation degree is greater than a first similarity aggregation degree threshold, the questionable device is determined as a faulty device. According to this implementation, the similarity aggregation degree of the QoE experience indicators of the plurality of lower-hierarchy devices of the questionable device is determined, to further determine whether the questionable device is a faulty device, so that accuracy of fault localization is further improved.

In a possible implementation, QoE experience indicators of a plurality of lower-hierarchy units of the questionable unit are clustered, where each cluster includes at least one QoE experience indicator; a proportion of a cluster including a largest quantity of QoE experience indicators in a total quantity of the QoE experience indicators of the plurality of lower-hierarchy units is determined as a second similarity aggregation degree of the QoE experience indicators of the plurality of lower-hierarchy units of the questionable unit is determined; and when the second similarity aggregation degree is greater than a second similarity aggregation degree threshold, the questionable unit is determined as a faulty unit. According to this implementation, the similarity aggregation degree of the QoE experience indicators of the plurality of lower-hierarchy units of the questionable unit is determined, to further determine whether the questionable unit is a faulty unit, so that accuracy of fault localization is further improved.

In a possible implementation, when there are a plurality of same hierarchy questionable units, a third similarity aggregation degree of the QoE experience indicators of the plurality of lower-hierarchy units of the plurality of questionable units is determined; and the plurality of questionable units are all determined as faulty units when the third similarity aggregation degree is greater than a third similarity aggregation degree threshold, and a proportion of a quantity of QoE experience indicators of each lower-hierarchy unit in a cluster corresponding to the third similarity aggregation degree in a total quantity of the QoE experience indicators of a questionable unit to which the lower-hierarchy unit belongs is greater than a preset proportion. According to this implementation, a joint analysis is performed on the lower-hierarchy units of the plurality of same hierarchy questionable units, so that missing of faulty units can be avoided. Problems such as cross-board can be found in this manner, and accuracy of fault localization is high.

In a possible implementation, the QoE experience indicator is a poor-QoE rate; an indicator algorithm corresponding to the poor-QoE rate of each network device is: the poor-QoE rate of the network device is equal to a total quantity of poor-QoE users of the network device divided by a total quantity of users of the network device; and/or an indicator algorithm corresponding to the poor-QoE rate of each device internal unit is: the poor-QoE rate of the device internal unit is equal to a total quantity of poor-QoE users of the device internal unit divided by a total quantity of users of the device internal unit, where whether a user corresponding to the user experience data is a poor-QoE user is determined based on a value relationship between the user experience data and an experience threshold; and that the QoE represented by the QoE experience indicator of the network device is lower than the QoE represented by the device screening threshold specifically includes that the poor-QoE rate of the network device is less than the device screening threshold. Optionally, when the user experience data includes only one of the foregoing items, for example, includes only the vMOS, there may be only one experience threshold, and the experience threshold is an experience threshold corresponding to the vMOS; and when the user experience data includes some or all of the foregoing items, for example, includes the vMOS and the stalling duration, each item may have an experience threshold, and whether a user corresponding to the user experience data is a poor-QoE user is comprehensively determined based on a value relationship between the user experience data of each item and the corresponding experience threshold. According to this implementation, the manner of determining the QoE experience indicator is simple and easy to implement, and an experience status of users served by the network devices can be accurately reflected.

Optionally, the QoE experience indicator is a VMOS average value or an average value of the stalling proportion. When the QoE experience indicator is the VMOS average value, the smaller VMOS average value indicates poorer user experience.

According to yet another aspect, an embodiment of the present disclosure provides a fault localization device. The device can implement functions performed in the foregoing method design of the first aspect. The functions may be implemented by hardware, or may be implemented by hardware executing corresponding software. The hardware or the software includes one or more modules corresponding to the functions.

In a possible design, a structure of the device includes a processor, and the processor is configured to support the device in performing a corresponding function in the foregoing method in the first aspect. The device may further include a memory. The memory is configured to couple to the processor, and store a program instruction and data for the device. The device may further include a communications interface, and the communications interface is configured to: obtain user experience data or send alarm information, or the like.

According to another aspect, an embodiment of the present disclosure provides a chip. The chip may be disposed in a device, and the chip includes a processor and an interface. The processor is configured to support the chip in performing a corresponding function in the method according to the first aspect. The interface is configured to support communication between the chip and another chip or another network element. The chip may further include a memory. The memory is configured to couple to the processor, and store a program instruction and data for the chip.

According to yet another aspect, an embodiment of the present disclosure provides a computer storage medium configured to store a computer software instruction used by the foregoing device. The computer storage medium includes a program designed to perform the foregoing first aspect.

According to yet another aspect, an embodiment of the present disclosure provides a computer program product that includes an instruction, and when the program is executed by a computer, the instruction enables the computer to perform a function performed by the device in the foregoing method design.

DETAILED DESCRIPTION

Figure 1:
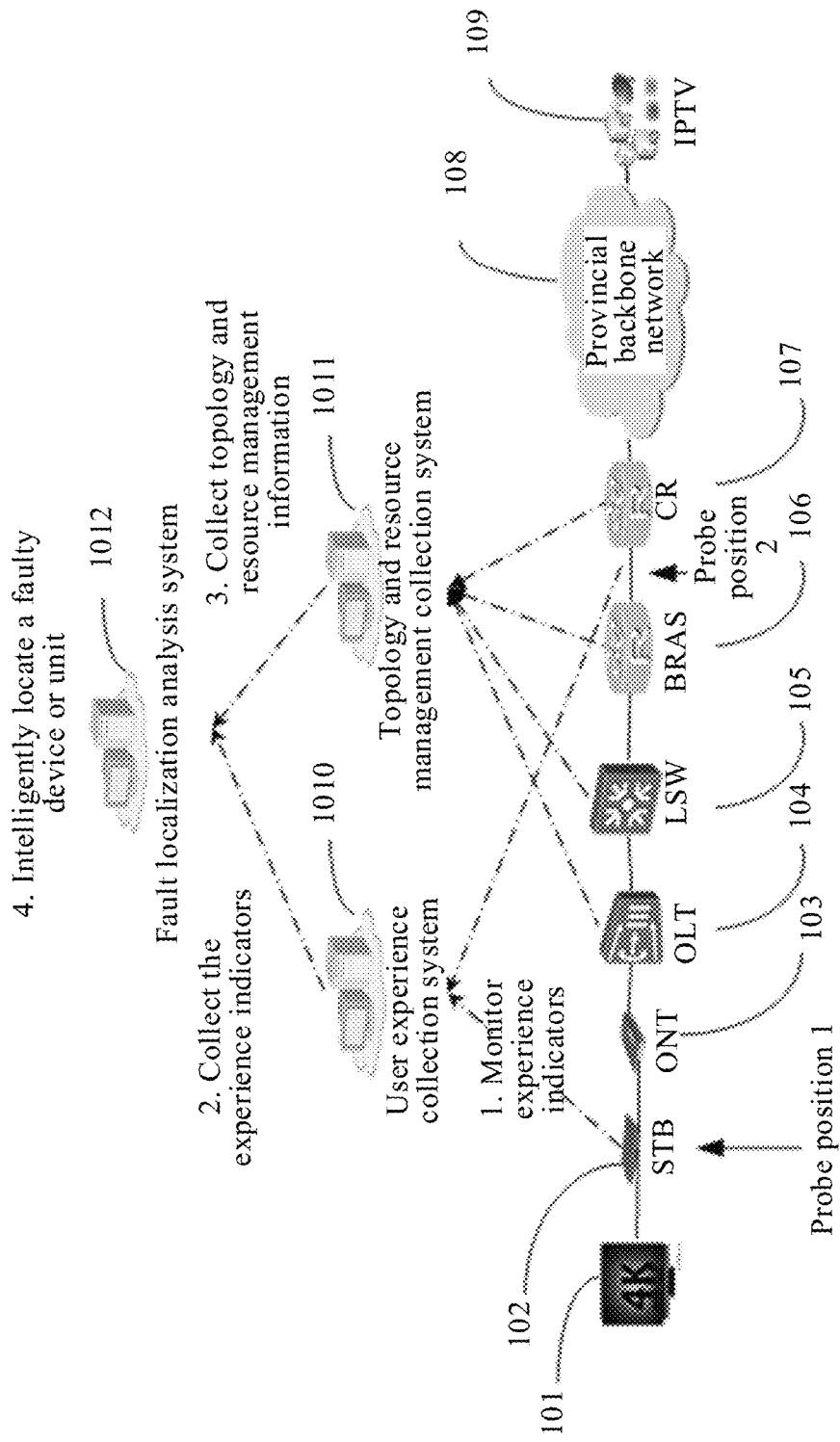
FIG. 1 is a schematic architectural diagram of a system according to an embodiment of the present disclosure.

FIG. 1 is a schematic architectural diagram of a system according to an embodiment of the present disclosure. The system includes a television set 101, a set-top box (STB) 102, an optical network terminal (ONT) 103, an optical line terminal (OLT) 104, a limit switch (LSW) 105, a broadband remote access server (BRAS) 106, a core router (CR) 107, a provincial backbone network 108, an IPTV server 109, a user experience collection system 1010, a topology and resource management collection system 1011, and a fault localization analysis system 1012. The user experience collection system 1010, connected to a related device (for example, the STB), is configured to collect user experience data, where the user experience data is used to represent user experience. The topology and resource management collection system 1011, connected to related devices (for example, the OLT, the LSW, the BRAS, and the CR), is configured to obtain network topology data and resource management data, where the network topology data is used to represent a connection relationship between network devices, and the resource management data is used to represent a connection relationship between user equipment and the network devices. In one example, the user experience data is collected by using a probe and reported to the user experience collection system 1010; the topology and resource management collection system 1011 collects the network topology data (for example, a topology connection relationship or a service path of an existing network, where the service path is used to represent a connection relationship between the network devices through which service traffic flows) and the resource management data; then the user experience collection system 1010 and the topology and resource management collection system 1011 report the user experience data, the network topology data, and the resource management data to the fault localization analysis system 1012, and the fault localization analysis system 1012 detects a faulty device or further detects a faulty unit in a faulty device after detecting the faulty device. The probe configured to collect the user experience data may be deployed in, but are not limited to, the following two positions. A position 1 is on the set top box, that is, the probe is deployed on the set top box, and a position 2 is between the BRAS and the CR, that is, the probe is deployed between the BRAS and the CR. The fault localization analysis system 1012 in this embodiment of the present disclosure, the user experience collection system 1010, and the topology and resource management collection system 1011 may be separately deployed in different devices, or may be integrated in a same device.

In the foregoing system architecture, in a schematic illustration, one network device of each type is drawn. It may be understood that an actual system may include all the network devices in FIG. 1, or may include only some of the network devices in FIG. 1, and a quantity of network devices of each type may be one or more.

According to a fault localization method provided in embodiments of the present disclosure, user equipment served by a network device may be determined based on the network topology data and the resource management data, so that a QoE experience indicator of the network device is determined based on user experience data of the user equipment served by the network device. When QoE represented by the QoE experience indicator of the network device is lower than QoE represented by a preset level device screening threshold, the network device is determined as a possible questionable device.

In one example, a QoE experience indicator of each network device in the system may be determined first, and then a possible questionable device is sifted out based on the QoE experience indicator of each network device. This manner is highly accurate, and can avoid missing the possible questionable device.

In another example, QoE experience indicators of network devices in a hierarchy in the system may be determined first, and then a possible questionable device in the hierarchy is sifted out based on the QoE experience indicator of each network device in the hierarchy. This manner considers both accuracy and efficiency, and can save processing resources.

If a network device A is an upstream network device of a network device B, and the two network devices are adjacent to each other, the network device A is referred to as an upper-hierarchy network device of the network device B, and the network device B is referred to as a lower-hierarchy network device of the network device A. It may be understood that a plurality of network devices with a common upper-hierarchy network device are referred to as same hierarchy network devices; similarly, when a network device includes device internal units in a plurality of hierarchies, a plurality of device internal units with a common upper-hierarchy device internal unit are referred to as same hierarchy device internal units. In general, nodes with a common upper-hierarchy node are referred to as same hierarchy nodes.

To further improve accuracy of fault localization, in one example, based on sifting out a possible questionable device by using a value relationship between a QoE experience indicator of a network device and a device screening threshold, a distribution characteristic of QoE experience indicators of a plurality of same hierarchy network devices including the possible questionable device are further analyzed to determine a questionable device, and then whether the questionable device is a faulty device is determined based on a similarity aggregation degree of the QoE experience indicators of lower-hierarchy devices of the questionable device. In the fault localization method, not only the QoE experience indicator of one network device is taken into account, but also the QoE experience indicators of other network devices in the network are referenced, so that the faulty device is determined based on a comprehensive analysis, and the method has high accuracy.

Optionally, in the embodiments of the present disclosure, a process of determining the questionable device may be divided into the following three phases: phase 1: A distribution characteristic of QoE experience indicators of a plurality of same hierarchy network devices including a possible questionable device are analyzed, to initially determine a questionable device; phase 2: The distribution characteristic of the QoE experience indicators of a plurality of same hierarchy lower-hierarchy network devices of the questionable device are analyzed, to further determine the questionable device; phase 3: The questionable device is determined again based on a quantity of online users of the questionable device.

It may be understood that the phase 1 may be separately combined with the phase 2 or the phase 3, to relatively accurately identify the questionable device. For example, the phase 1 is performed first, and then the phase 2 is performed; or the phase 1 is performed first, and then the phase 3 is performed.

In one example, after the questionable device is determined, QoE experience indicators of device internal units of the questionable device may be further analyzed to determine a questionable unit; and whether the questionable unit is a faulty unit is determined based on a similarity aggregation degree of QoE experience indicators of lower-hierarchy units of the questionable unit.

In the embodiments of the present disclosure, the fault localization method has a plurality of implementations. For ease of understanding, the following describes the method processes.

Figure 2:
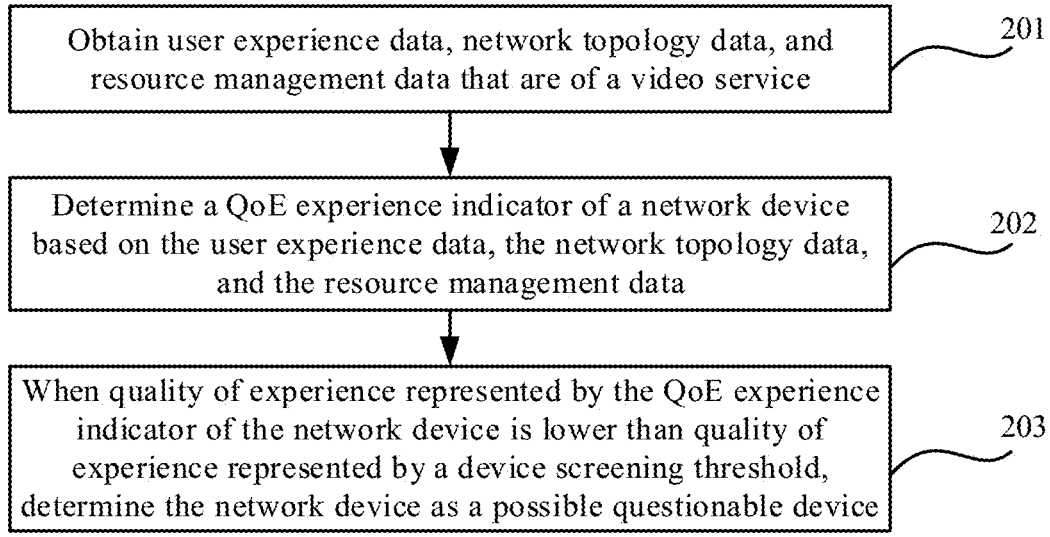
FIG. 2 is a flowchart of a fault localization method according to an embodiment of the present disclosure.

FIG. 2 is a flowchart of a fault localization method according to an embodiment of the present disclosure. The method may be based on the system architecture shown in FIG. 1, and an execution body may be the fault localization analysis system in FIG. 1. The method includes the following steps.

Step 201: Obtain user experience data, network topology data, and resource management data that are of a video service.

The user experience data is used to represent user experience, the network topology data is used to represent a connection relationship between network devices, and the resource management data is used to represent a connection relationship between user equipment and the network devices.

In one example, the user experience data includes at least one of the following items: a vMOS, stalling duration, a stalling proportion, stalling frequency, a blockiness duration proportion, blockiness times, a blockiness area proportion, video quality switch times, and a poor quality proportion of video quality. Video quality switch means that a user switches video quality, for example, switches the video quality from standard definition to high definition.

In one example, the network topology data includes a topology connection relationship or a service path of an existing network, and the service path is used to represent a connection relationship between the network devices through which service traffic flows.

Step 202: Determine a QoE experience indicator of a network device based on the user experience data, the network topology data, and the resource management data.

The QoE experience indicator of the network device is determined based on user experience data of user equipment served by the network device.

In one example, the user equipment served by the network device may be first determined based on the network topology data and the resource management data, and then the QoE experience indicator of the network device may be determined based on the user experience data of the user equipment served by the network device.

It may be understood that a QoE experience indicator of each network device in the system may be determined, or only a QoE experience indicator of each network device in a same hierarchy in the system may be determined. In this embodiment of the present disclosure, an example in which the QoE experience indicator of each network device in a same hierarchy in the system is first determined is used for description, and certainly, that the QoE experience indicator of each network device in another hierarchy is determined later as required is not excluded.

The QoE experience indicator and an indicator algorithm corresponding to the QoE experience indicator may be configured first, and then the QoE experience indicator in each hierarchy is determined based on the QoE experience indicator and the indicator algorithm corresponding to the QoE experience indicator.

In one example, the QoE experience indicator is a poor-QoE rate.

The indicator algorithm corresponding to the poor-QoE rate of each network device is: the poor-QoE rate of the network device is equal to a total quantity of poor-QoE users of the network device divided by a total quantity of users of the network device. For example, if the total quantity of users of the network device is 10, and the total quantity of poor-QoE users of the network device is 2, the network device has a 20% poor-QoE rate.

Whether a user corresponding to the user experience data is a poor-QoE user may be determined based on a value relationship between the user experience data and an experience threshold.

For example, when the user experience data of a user includes one of the foregoing items, if user experience represented by a value of the item is less than an experience level represented by an experience threshold corresponding to the item, the user is determined as a poor-QoE user; and if the user experience represented by the value of the item is greater than or equal to the experience level represented by the experience threshold corresponding to the item, the user is determined as a non-poor-QoE user. Example 1: The user experience data of the user includes the vMOS, and if a value of the vMOS is less than an experience threshold corresponding to the vMOS, the user is determined as a poor-QoE user. Example 2: The user experience data of the user includes the stalling duration, and if a value of the stalling duration is greater than an experience threshold corresponding to the stalling duration, the user is determined as a poor-QoE user.

For another example, when the user experience data of a user includes some or all of the foregoing items, if user experience represented by a value of each item is less than an experience level represented by an experience threshold corresponding to the item, the user is determined as a poor-QoE user; and if the user experience represented by the value of at least one item is greater than or equal to the experience level represented by the experience threshold corresponding to the item, the user is determined as a non-poor-QoE user.

For another example, when the user experience data of a user includes some or all of the foregoing items, values of the items may be weighted and summed, and if a summed value is less than an experience threshold, the user is determined as a poor-QoE user; and if the summed value is greater than or equal to the experience threshold, the user is determined as a non-poor-QoE user.

Optionally, the QoE experience indicator may alternatively be an average value of one item of the user experience data, such as an average value of the VMOS and an average value of the stalling proportion. If the QoE experience indicator is the average value of the VMOS, a smaller QoE experience indicator indicates poorer QoE.

Step 203: When QoE represented by the QoE experience indicator of the network device is lower than QoE represented by a device screening threshold, determine the network device as a possible questionable device.

The device screening threshold may be preset, or may be determined based on a distribution status of QoE experience indicators of a plurality of network devices (for example, a plurality of OLTs) of a same type as the network device.

If a larger QoE experience indicator indicates lower QoE, for example, the QoE experience indicator is an average value of poor-QoE rates or an average value of the stalling proportions, a specific implementation of step 203 may be that when the QoE experience indicator of the network device is greater than the device screening threshold, the network device is determined as the possible questionable device.

If a larger QoE experience indicator indicates higher QoE, for example, the QoE experience indicator is an average value of the VMOSs, a specific implementation of step 203 may be that when the QoE experience indicator of the network device is less than the device screening threshold, the network device is determined as the possible questionable device.

In this embodiment of the present disclosure, the user experience data, the network topology data, and the resource management data that are of the video service may be obtained, so that the QoE experience indicator of the network device can be determined. The QoE experience indicator of the network device is determined based on the user experience data of the user equipment served by the network device. This is different from a manner in which a QoS indicator of the network device is directly determined by obtaining a parameter of the network device. Therefore, compared with a method for performing fault localization by monitoring the QoS indicator, this method can better reflect user experience and has higher accuracy.

In the embodiment shown in FIG. 2, after the network device is determined as the possible questionable device, the process may end, and the possible questionable device can be manually checked later. To further improve accuracy of fault localization, in another embodiment of the present disclosure, a questionable device is further determined based on the determined possible questionable device, and the questionable device is more likely to be faulty than the possible questionable device.

Figure 3A:
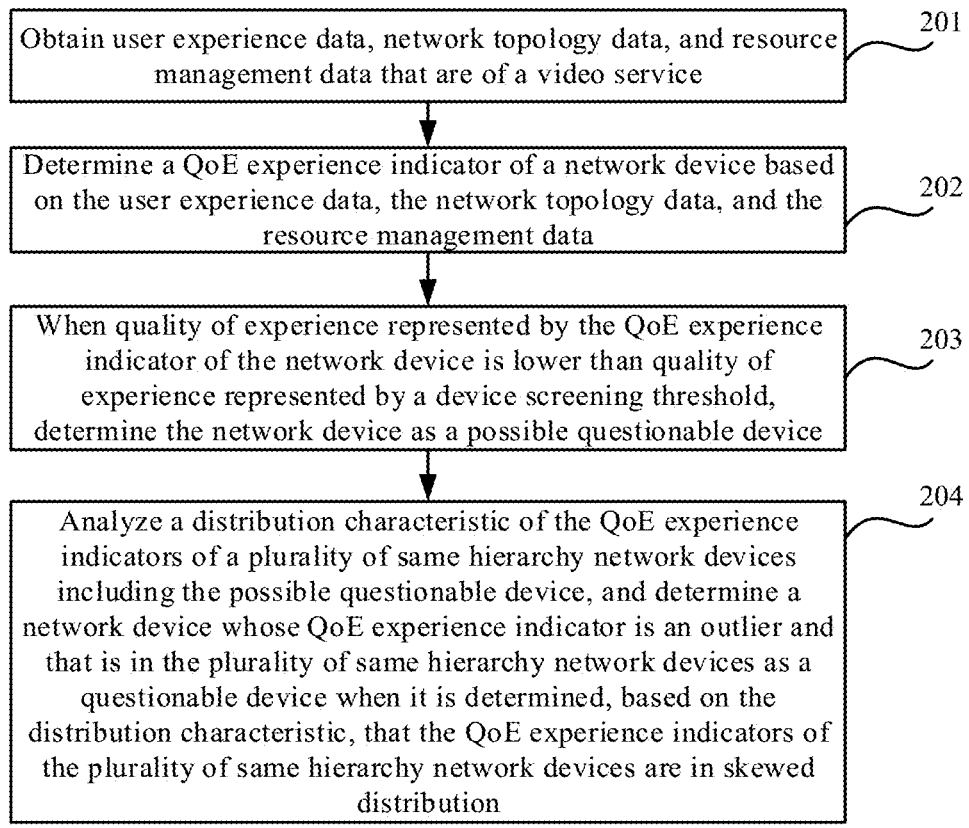
FIG. 3A is a flowchart of another fault localization method according to an embodiment of the present disclosure.

FIG. 3A is a flowchart of another fault localization method according to an embodiment of the present disclosure. Based on the method process shown in FIG. 2, a questionable device is further located through equilibrium skew analysis. In addition to the foregoing steps 201 to 203, the method further includes the following step.

Step 204: Analyze a distribution characteristic of the QoE experience indicators of a plurality of same hierarchy network devices including the possible questionable device, and determine a network device whose QoE experience indicator is an outlier and that is in the plurality of same hierarchy network devices as a questionable device when it is determined, based on the distribution characteristic, that the QoE experience indicators of the plurality of same hierarchy network devices are in skewed distribution.

It may be understood that when there are a plurality of possible questionable devices in the system that belong to a same hierarchy, step 204 may be performed on only one of the plurality of possible questionable devices that belong to the same hierarchy; and when there are a plurality of possible questionable devices in the system that belong to different hierarchies, step 204 may be separately performed on the plurality of possible questionable devices that belong to different hierarchies. For example, if four possible questionable devices in a same hierarchy in the system are respectively a possible questionable device A, a possible questionable device B, a possible questionable device C, and a possible questionable device D, step 204 may be performed only for the possible questionable device A. There is a greater likelihood that at least one of the plurality of possible questionable devices is determined as the questionable device.

Figure 4A:
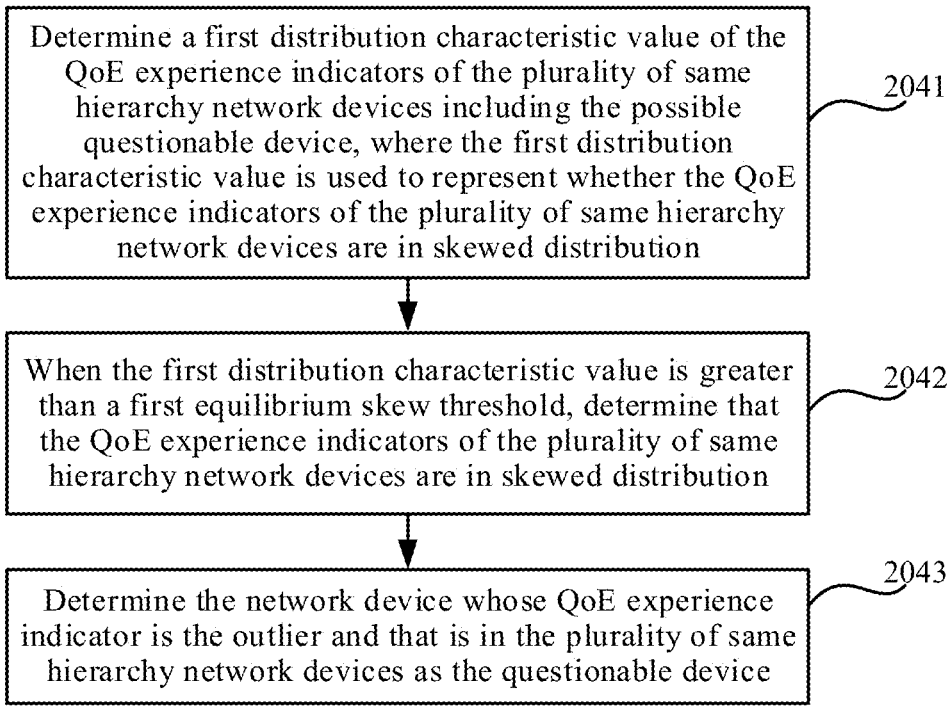
FIG. 4A is a flowchart of a method of step 204 in any one of FIG. 3A to FIG. 3D.

As shown in FIG. 4A, in one example, step 204 includes the following steps.

Step 2041: Determine a first distribution characteristic value of the QoE experience indicators of the plurality of same hierarchy network devices including the possible questionable device, where the first distribution characteristic value is used to represent whether the QoE experience indicators of the plurality of same hierarchy network devices are in skewed distribution.

Same hierarchy network devices may be understood as network devices with a same upper-hierarchy network device, and network devices with a same upper-hierarchy network device are usually network devices of a same type, for example, are all OLTs.

In one example, the first distribution characteristic value is a coefficient of variation.

Step 2042: When the first distribution characteristic value is greater than a first equilibrium skew threshold, determine that the QoE experience indicators of the plurality of same hierarchy network devices are in skewed distribution.

Step 2043: Determine the network device whose QoE experience indicator is the outlier and that is in the plurality of same hierarchy network devices as the questionable device.

According to this implementation, that the QoE experience indicators of the plurality of same hierarchy network devices are in skewed distribution is determined by using a value relationship between the first distribution characteristic value and the first equilibrium skew threshold, to determine the questionable device. This manner has high accuracy.

Figure 4B:
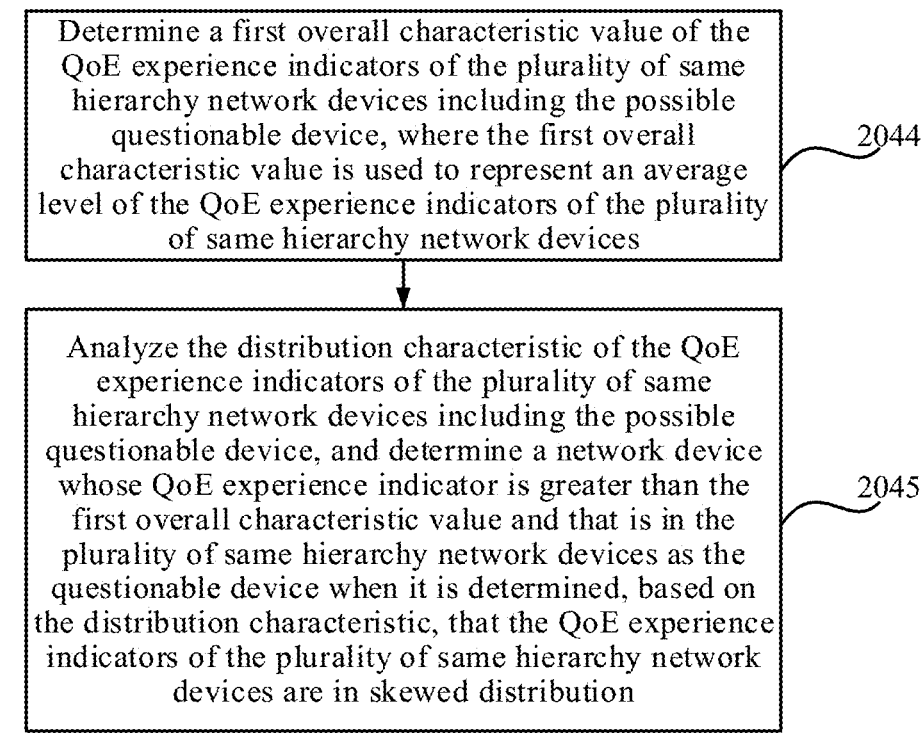
FIG. 4B is a flowchart of another method of step 204 in any one of FIG. 3A to FIG. 3D.

As shown in FIG. 4B, in another example, step 204 includes the following steps.

Step 2044: Determine a first overall characteristic value of the QoE experience indicators of the plurality of same hierarchy network devices including the possible questionable device, where the first overall characteristic value is used to represent an average level of the QoE experience indicators of the plurality of same hierarchy network devices.

Optionally, the first overall characteristic value is an average value or a median or an empirically set value used to represent the average level. The foregoing average value may be a direct average value or a weighted average value. For example, when a quantity of users served by the network device is large, a weighting coefficient of the QoE experience indicator of the network device is large.

Step 2045: Analyze the distribution characteristic of the QoE experience indicators of the plurality of same hierarchy network devices including the possible questionable device, and determine the network device whose QoE experience indicator is greater than the first overall characteristic value and that is in the plurality of same hierarchy network devices as the questionable device when it is determined, based on the distribution characteristic, that the QoE experience indicators of the plurality of same hierarchy network devices are in skewed distribution.

According to this implementation, the first overall characteristic value is determined and the QoE experience indicators of the plurality of same hierarchy network devices are compared with the first overall characteristic value, so that the network device whose QoE experience indicator is the outlier and that is in the plurality of same hierarchy network devices is determined, and the network device is determined as the questionable device. This manner has high accuracy.

Figure 4C:
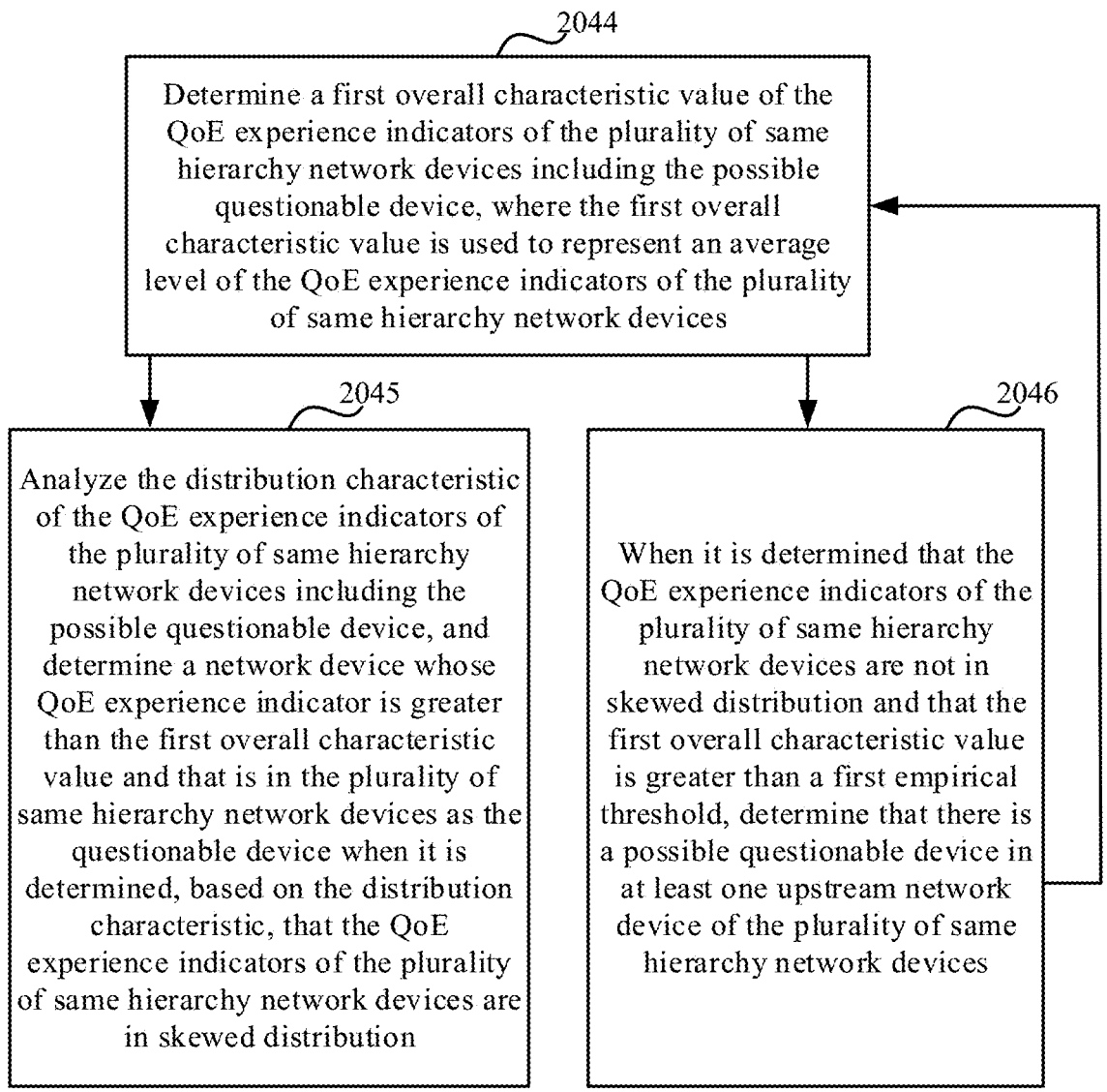
FIG. 4C is a flowchart of another method of step 204 in any one of FIG. 3A to FIG. 3D.

As shown in FIG. 4C, in another example, based on the method process shown in FIG. 4B, in addition to step 2044 and step 2045, step 204 further includes the following step.

Step 2046: When it is determined that the QoE experience indicators of the plurality of same hierarchy network devices are not in skewed distribution and that the first overall characteristic value is greater than a first empirical threshold, determine that there is a possible questionable device in at least one upstream network device of the plurality of same hierarchy network devices.

According to this implementation, when the QoE experience indicators of the plurality of same hierarchy network devices are evenly distributed and the first overall characteristic value is abnormal, it is determined that there is a possible questionable device in the at least upstream network device of the plurality of same hierarchy network devices. Each method included in the embodiment in FIG. 3A may be performed on the possible questionable device in the at least one upstream network device, to further locate the questionable device through equilibrium skew analysis. Details are not described herein again.

It may be understood that the embodiments corresponding to FIG. 4A, FIG. 4B, and FIG. 4C may be combined with each other to form a new embodiment. For example, in an embodiment, whether the QoE experience indicators of the plurality of same hierarchy network devices are in skewed distribution is first determined by using the value relationship between the first distribution characteristic value and the first equilibrium skew threshold. When the QoE experience indicators of the plurality of same hierarchy network devices are in skewed distribution, the first overall characteristic value is determined, and the QoE experience indicators of the plurality of same hierarchy network devices are compared with the first overall characteristic value, so that the network device whose QoE experience indicator is the outlier and that is in the plurality of same hierarchy network devices is determined, and the network device is determined as the questionable device. In addition, when the QoE experience indicators of the plurality of same hierarchy network devices are not in skewed distribution and the first overall characteristic value is greater than the first empirical threshold, it is determined that there is the possible questionable device in the at least one upstream network device of the plurality of same hierarchy network devices. When it is determined that there is the possible questionable device in the at least one upstream network device of the plurality of same hierarchy network devices, a common upper-hierarchy network device of the plurality of same hierarchy network devices may be used as the possible questionable device, and step 204 is performed for the possible questionable device.

Figure 3B:
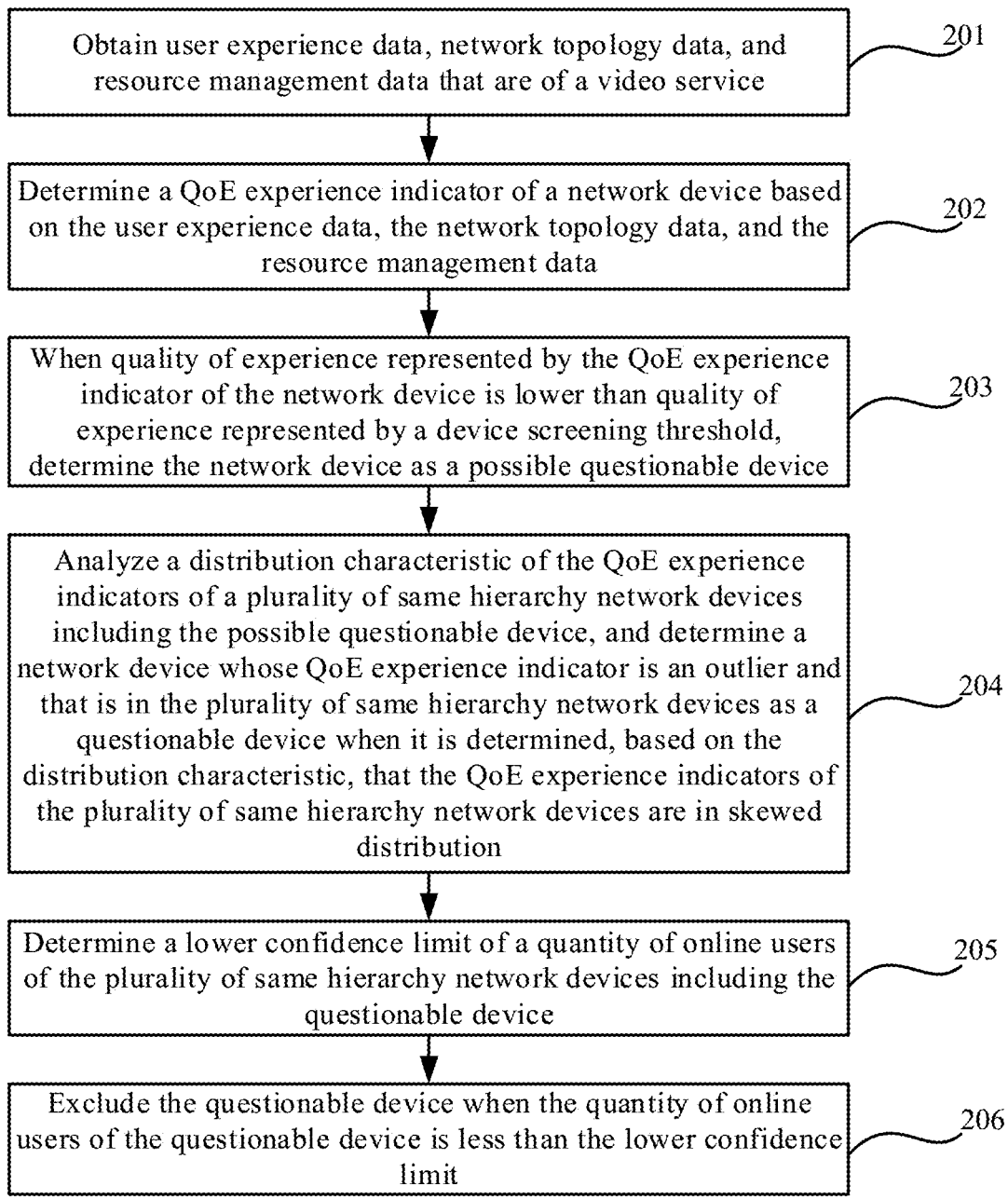
FIG. 3B is a flowchart of another fault localization method according to an embodiment of the present disclosure.

In one example, as shown in FIG. 3B, after the questionable device is determined in step 204, the questionable device may also be further confirmed or excluded based on a quantity of online users of the network device. The method further includes steps 205 and 206.

Step 205: Determine a lower confidence limit of a quantity of online users of the plurality of same hierarchy network devices including the questionable device.

Step 206: Exclude the questionable device when the quantity of online users of the questionable device is less than the lower confidence limit.

It may be understood that the questionable device is excluded, that is, the questionable device is confirmed as a normal device.

According to this implementation, the questionable device with excessively few online users may be reconfirmed as the normal device.

Figure 3C:
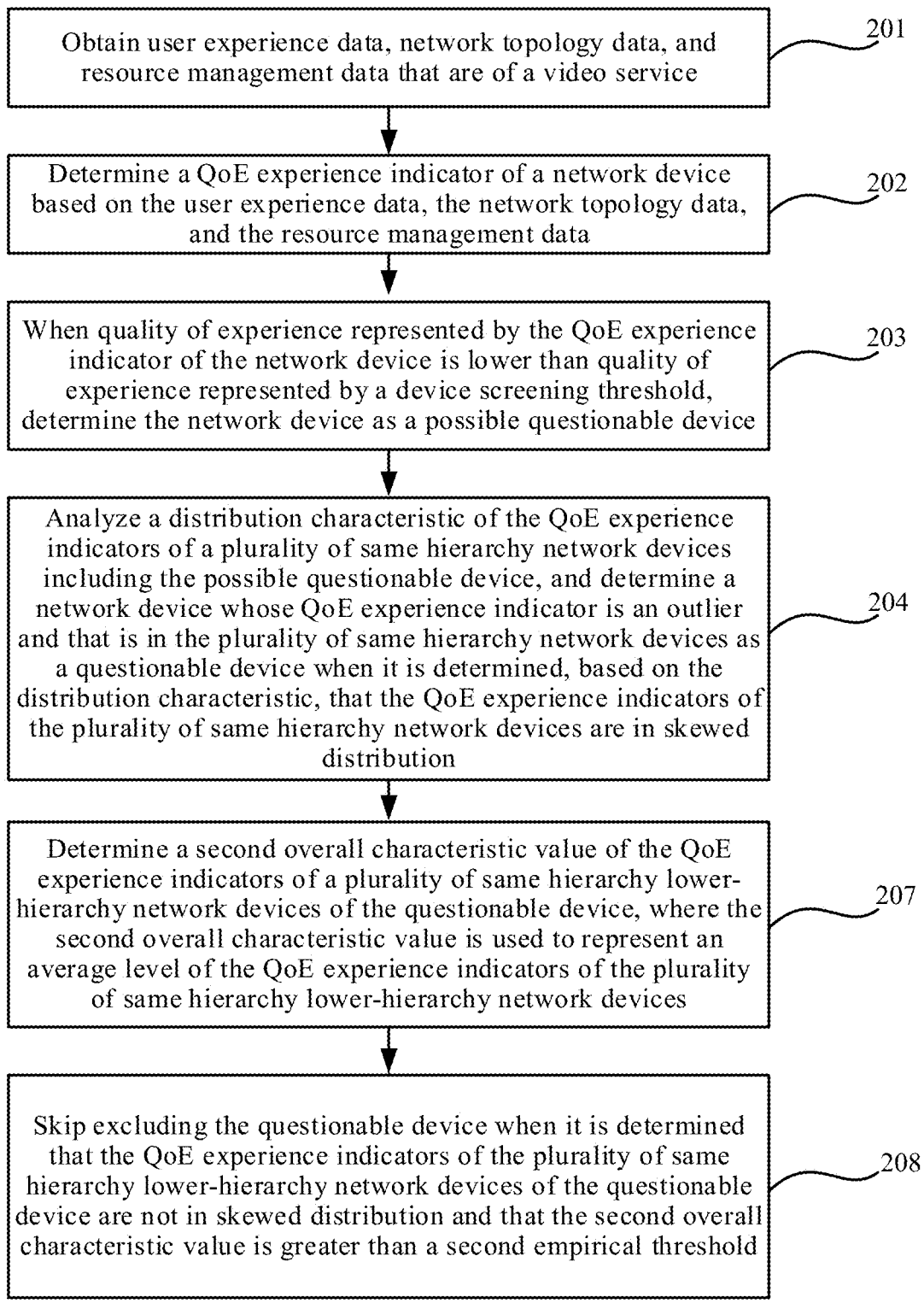
FIG. 3C is a flowchart of another fault localization method according to an embodiment of the present disclosure.

In one example, as shown in FIG. 3C, after the questionable device is located in step 204, the questionable device may also be further confirmed or excluded with reference to a distribution characteristic of QoE experience indicators of lower-hierarchy network devices. The method further includes steps 207 and 208.

Step 207: Determine a second overall characteristic value of the QoE experience indicators of a plurality of same hierarchy lower-hierarchy network devices of the questionable device, where the second overall characteristic value is used to represent an average level of the QoE experience indicators of the plurality of same hierarchy lower-hierarchy network devices.

Step 208: Skip excluding the questionable device when it is determined that the QoE experience indicators of the plurality of same hierarchy lower-hierarchy network devices of the questionable device are not in skewed distribution and that the second overall characteristic value is greater than a second empirical threshold.

Whether the QoE experience indicators of the plurality of same hierarchy lower-hierarchy network devices of the questionable device are in skewed distribution may be determined, but is not limited to, in a manner in which the first distribution characteristic value is compared with the first equilibrium skew threshold.

It may be understood that, the questionable device is not excluded, that is, the questionable device is further determined.

In addition, the method may further include: excluding the questionable device when it is determined that the QoE experience indicators of the plurality of same hierarchy lower-hierarchy network devices of the questionable device are in skewed distribution; or excluding the questionable device when it is determined that the QoE experience indicators of the plurality of same hierarchy lower-hierarchy network devices of the questionable device are not in skewed distribution and that the second overall characteristic value is less than or equal to the second empirical threshold. The excluding questionable device is to reconfirm the questionable device as a normal network device. In addition, when it is determined that the QoE experience indicators of the plurality of same hierarchy lower-hierarchy network devices of the questionable device are in skewed distribution, a network device whose QoE experience indicator is an outlier and that is in the plurality of same hierarchy lower-hierarchy network devices may further be determined as the questionable device, and steps 205 and 206 and/or steps 207 and 208 are performed for the determined questionable device.

According to this implementation, after the questionable device is initially determined, the distribution characteristic of the QoE experience indicators of the plurality of same hierarchy lower-hierarchy network devices of the questionable device are analyzed, to further determine or exclude the questionable device, thereby improving accuracy of determining the questionable device.

Figure 3D:
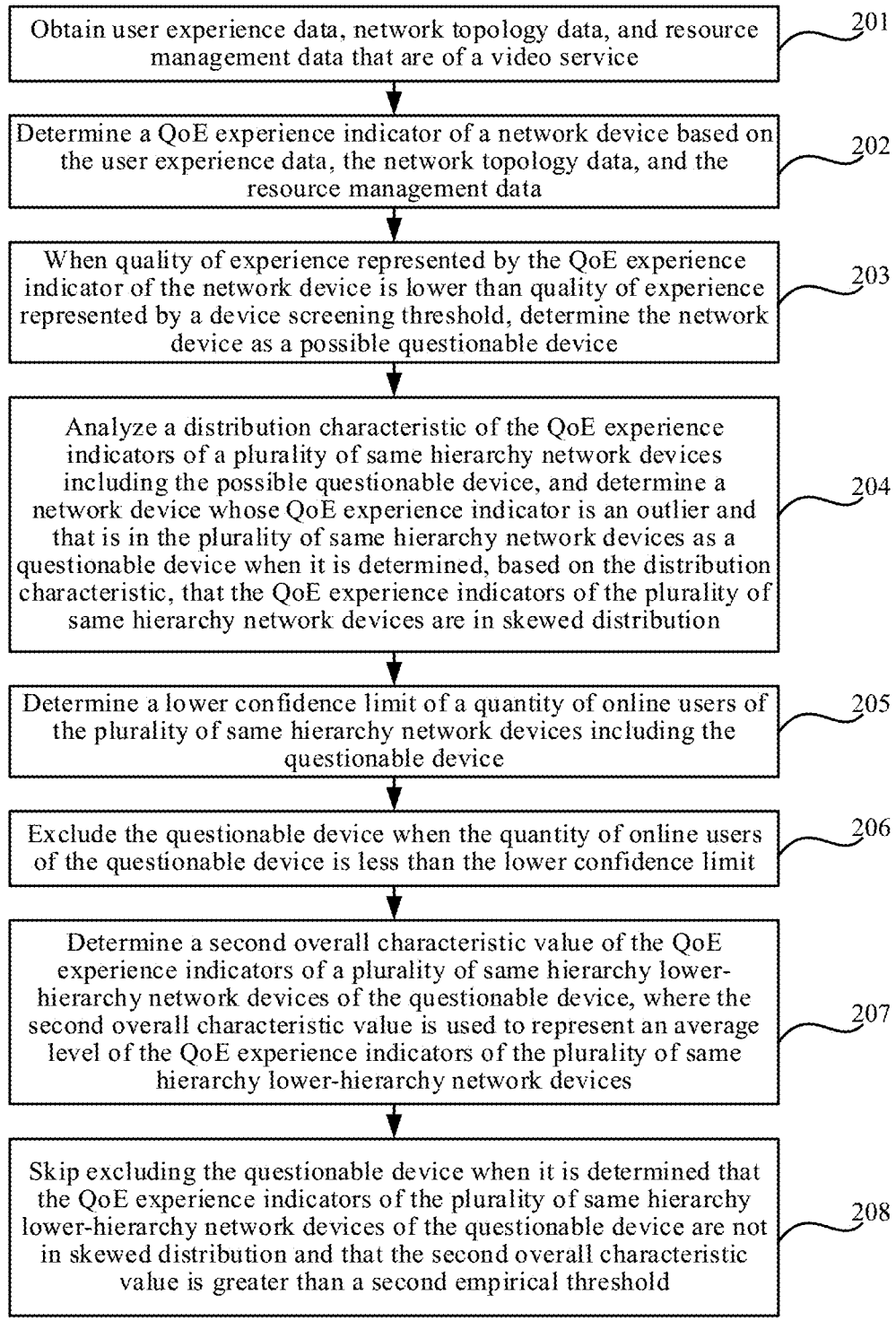
FIG. 3D is a flowchart of another fault localization method according to an embodiment of the present disclosure.

It may be understood by a person skilled in the art that the foregoing steps may be combined to form a plurality of possible embodiments. For example, a scheme includes steps 201 to 204, that is, the scheme shown in FIG. 3A; another scheme includes steps 201 to 206, that is, the scheme shown in FIG. 3B; still another scheme includes steps 201 to 204, 207, and 208, that is, the scheme shown in FIG. 3C; and yet another scheme includes steps 201 to 208, that is, the scheme shown in FIG. 3D.

Usually, inside of a network device includes device internal units in at least one hierarchy, for example, a board-subcard-port-link hierarchy.

Figure 5A:
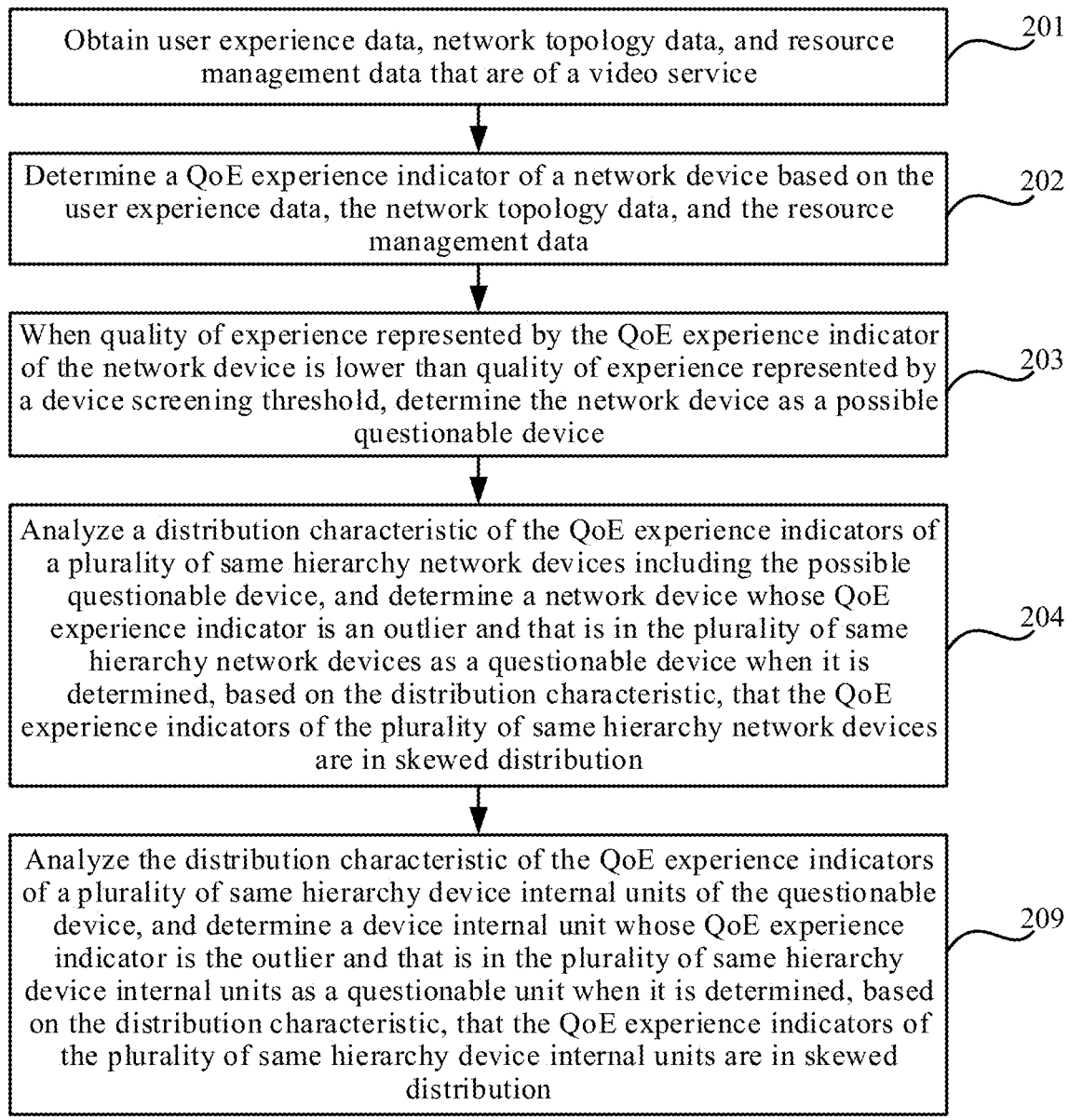
FIG. 5A is a flowchart of another fault localization method according to an embodiment of the present disclosure.

In one example, the questionable device includes a plurality of device internal units in at least one hierarchy. FIG. 5A is a flowchart of still another fault localization method according to an embodiment of the present disclosure. Based on locating the questionable device, an internal unit of the questionable device (or questionable unit) is further located through equilibrium skewed analysis. The method may be based on FIG. 3A, FIG. 3B, FIG. 3C, or FIG. 3D. FIG. 5A is only an example of the method based on FIG. 3A for description. In addition to the foregoing steps 201 to 204, the method further includes the following step.

Step 209: Analyze the distribution characteristic of the QoE experience indicators of the plurality of same hierarchy device internal units of the questionable device, and determine a device internal unit whose QoE experience indicator is an outlier and that is in the plurality of same hierarchy device internal units as a questionable unit when it is determined, based on the distribution characteristic, that the QoE experience indicators of the plurality of same hierarchy device internal units are in skewed distribution.

In one example, the questionable device includes device internal units in a plurality of hierarchies, and step 209 may be performed to analyze only the QoE experience indicators of device internal units in a hierarchy. For example, the questionable device includes device internal units in three hierarchies, which are respectively, a first hierarchy, a second hierarchy, and a third hierarchy from bottom to top, and only the QoE experience indicators of the device internal units in the second hierarchy may be analyzed. If necessary, the QoE experience indicators of the device internal units at the upper hierarchy or lower hierarchy of the second hierarchy are analyzed subsequently. The first hierarchy is referred to as a lower hierarchy of the second hierarchy, and the third hierarchy is referred to as an upper hierarchy of the second hierarchy.

A method for determining whether the QoE experience indicators of the plurality of same hierarchy device internal units are in skewed distribution based on the distribution characteristic may be similar to the method for determining whether the QoE experience indicators of the plurality of same hierarchy network devices are in skewed distribution based on the distribution characteristic. Details are not described herein again.

Similarly, a method for searching for a device internal unit whose QoE experience indicator is an outlier and that is on the plurality of same hierarchy device internal units may be similar to the method for searching for the network device whose QoE experience indicator an outlier and that in the plurality of same hierarchy network devices. Details are not described herein again.

Figure 5B:
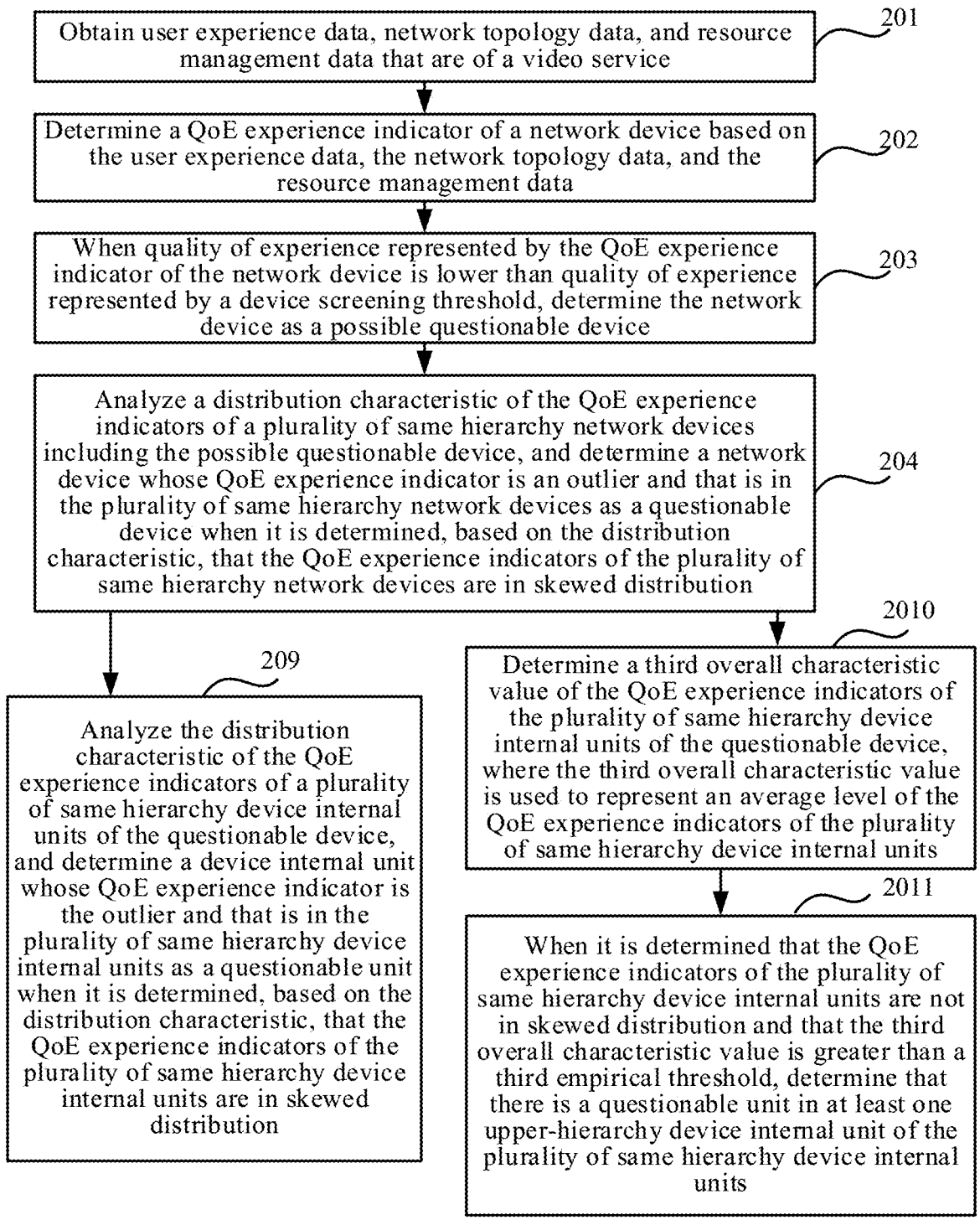
FIG. 5B is a flowchart of another fault localization method according to an embodiment of the present disclosure.

Optionally, as shown in FIG. 5B, the method further includes the following steps.

Step 2010: Determine a third overall characteristic value of the QoE experience indicators of a plurality of same hierarchy device internal units of the questionable device, where the third overall characteristic value is used to represent an average level of the QoE experience indicators of the plurality of same hierarchy device internal units.

Step 2011: When it is determined that the QoE experience indicators of the plurality of same hierarchy device internal units are not in skewed distribution and that the third overall characteristic value is greater than a third empirical threshold, determine that there is a questionable unit in at least one upper-hierarchy device internal unit of the plurality of same hierarchy device internal units.

It may be understood that after it is determined in step 2011 that there is the questionable unit in the at least one upper-hierarchy device internal unit of the plurality of same hierarchy device internal units, the QoE experience indicator of the at least one upper-hierarchy device internal unit of the plurality of same hierarchy device internal units may further be analyzed in any manner included in FIG. 5A and FIG. 5B, to determine the questionable unit in the at least one upper-hierarchy device internal unit. For example, step 209 and/or 2010 to 2011 may be performed by using a neighboring upper-hierarchy device internal unit common to the plurality of same hierarchy device internal units as the questionable unit.

Figure 5C:
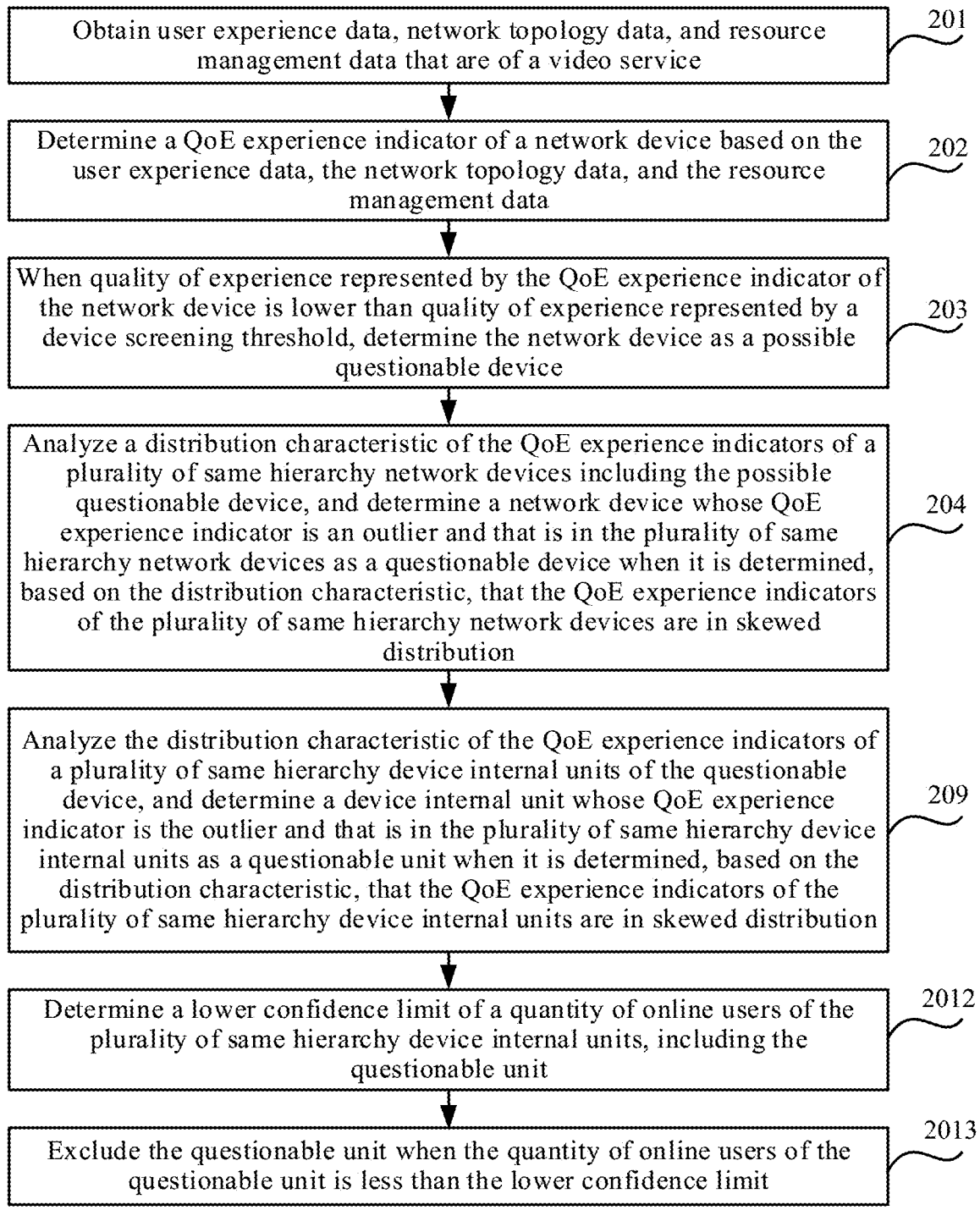
FIG. 5C is a flowchart of another fault localization method according to an embodiment of the present disclosure.

In one example, after step 209, the questionable unit may further be excluded or confirmed with reference to a quantity of online users. As shown in FIG. 5C, the method further includes the following steps.

Step 2012: Determine a lower confidence limit of a quantity of online users of the plurality of same hierarchy device internal units including the questionable unit.

Step 2013: Exclude the questionable unit when the quantity of online users of the questionable unit is less than the lower confidence limit.

The excluding questionable unit is to reconfirm the questionable unit as a normal unit.

According to this implementation, a questionable unit with excessively few online users may be excluded to improve accuracy of determining a questionable unit.

Figure 5D:
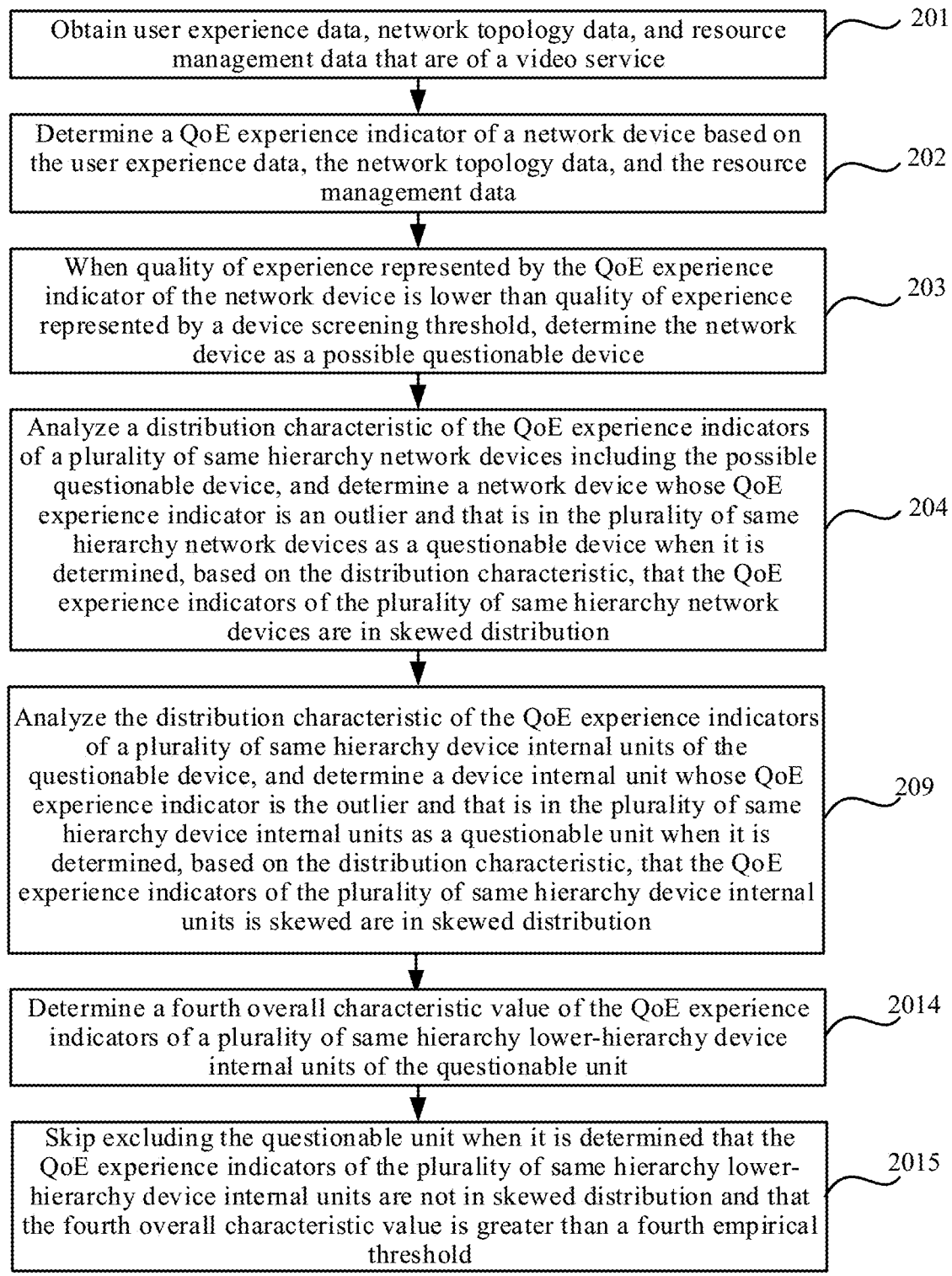
FIG. 5D is a flowchart of another fault localization method according to an embodiment of the present disclosure.

In one example, after step 209, the questionable unit may further be excluded or confirmed with reference to the distribution characteristic of the QoE experience indicators of the plurality of same hierarchy lower-hierarchy device internal units of the questionable unit. As shown in FIG. 5D, the method further includes the following steps.

Step 2014: Determine a fourth overall characteristic value of the QoE experience indicators of the plurality of same hierarchy lower-hierarchy device internal units of the questionable unit.

Step 2015: Skip excluding the questionable unit when it is determined that the QoE experience indicators of the plurality of same hierarchy lower-hierarchy device internal units are not in skewed distribution and that the fourth overall characteristic value is greater than a fourth empirical threshold.

According to this implementation, after the questionable unit is initially determined, the questionable unit may further be determined or excluded based on the distribution characteristic of the QoE experience indicators of the plurality of same hierarchy lower-hierarchy device internal units of the questionable unit, thereby further improving accuracy of determining the questionable unit.

In addition, the method may further include: excluding the questionable unit when it is determined that the QoE experience indicators of the plurality of same hierarchy lower-hierarchy device internal units of the questionable unit are in skewed distribution; or excluding the questionable unit when it is determined that the QoE experience indicators of the plurality of same hierarchy lower-hierarchy device internal units of the questionable unit are not in skewed distribution and that the fourth overall characteristic value is less than or equal to the fourth empirical threshold. The excluding the questionable unit is to reconfirm the questionable unit as a normal device internal unit. In addition, when it is determined that the QoE experience indicators of the plurality of same hierarchy lower-hierarchy device internal units of the questionable unit are in skewed distribution, a device internal unit whose QoE experience indicator is an outlier and that is in the plurality of same hierarchy lower-hierarchy device internal units may further be determined as the questionable unit, and steps 2012 and 2013 and/or steps 2014 and 2015 are performed for the device internal unit that is determined as the questionable unit and that is in the plurality of same hierarchy device internal units.

It may be understood by a person skilled in the art that the foregoing steps may be combined to form a plurality of possible embodiments. For example, one scheme includes steps 201 to 204, and step 209, that is, the scheme shown in FIG. 5A; another scheme includes steps 201 to 204, and steps 209 to 2011, that is, the scheme shown in FIG. 5B; still another scheme includes steps 201 to 204, and steps 209, 2012 and 2013, that is, the scheme shown in FIG. 5C; and yet another scheme includes steps 201 to 204, and steps 209, 2014, and 2015, that is, the scheme shown in FIG. 5D.

Figure 6A:
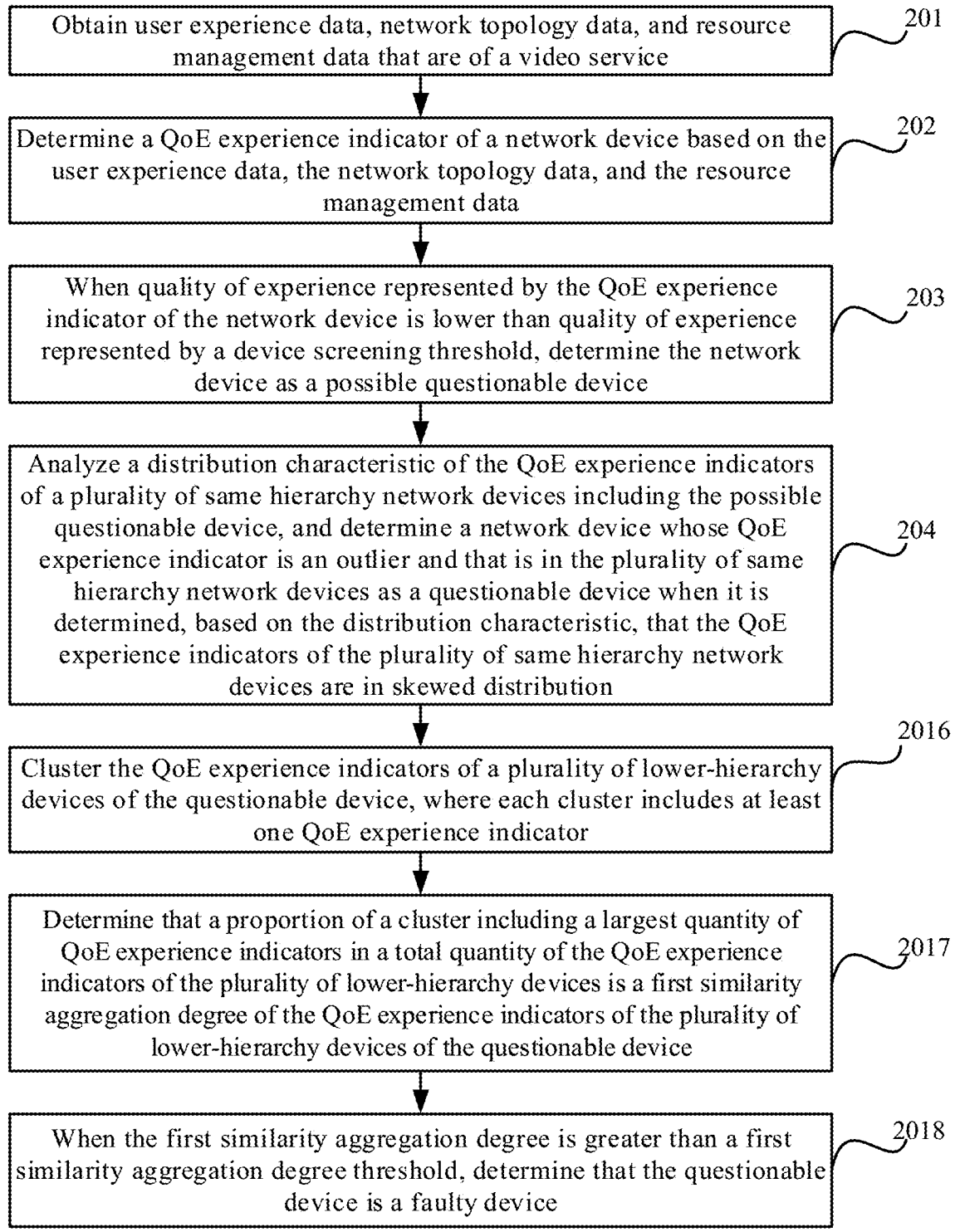
FIG. 6A is a flowchart of another fault localization method according to an embodiment of the present disclosure.

In one example, after a questionable device is determined, a similarity aggregation degree of QoE experience indicators of a plurality of lower-hierarchy devices of the questionable device may further be analyzed to further determine whether the questionable device is faulty. As shown in FIG. 6A, in addition to steps 201 to 204, the method further includes the following steps.

Step 2016: Cluster the QoE experience indicators of a plurality of lower-hierarchy devices of the questionable device, where each cluster includes at least one QoE experience indicator.

For example, the lower-hierarchy devices of an OLT include an ONT 1, an ONT 2, an ONT 3, and an ONT 4.

A total quantity of the QoE experience indicators of the lower-hierarchy devices is 4, and after the QoE experience indicator of the ONT 1, the QoE experience indicator of the ONT 2, the QoE experience indicator of the ONT 3, and the QoE experience indicator of the ONT 4 are clustered, two clusters of the QoE experience indicators are obtained. A first cluster includes one QoE experience indicator, which is the QoE experience indicator of the ONT 1. A second cluster includes three QoE experience indicators, which are the QoE experience indicator of the ONT 2, the QoE experience indicator of the ONT 3, and the QoE experience indicator of the ONT 4.

Step 2017: Determine that a proportion of a cluster including a largest quantity of QoE experience indicators in a total quantity of the QoE experience indicators of the plurality of lower-hierarchy devices is a first similarity aggregation degree of the QoE experience indicators of the plurality of lower-hierarchy devices of the questionable device.

The second cluster includes the largest quantity of QoE experience indicators, the proportion of the quantity of QoE experience indicators of the second cluster in the total quantity of the QoE experience indicators of the lower-hierarchy devices is ¾, namely, 75%. Therefore, the first similarity aggregation degree is 75%.

Step 2018: When the first similarity aggregation degree is greater than a first similarity aggregation degree threshold, determine that the questionable device is a faulty device.

If the first similarity aggregation degree threshold is 70%, the first similarity aggregation degree is greater than the first similarity aggregation degree threshold, and it is determined that the questionable device is a faulty device.

According to this implementation, the similarity aggregation degree of the QoE experience indicators of the plurality of lower-hierarchy devices of the questionable device is determined, to further determine whether the questionable device is a faulty device, so that accuracy of fault localization is further improved.

Optionally, according to the foregoing process of determining the questionable unit, after the questionable device is determined, the QoE experience indicators of the device internal units of the questionable device may be analyzed to determine the questionable unit; or after the questionable device is determined as the faulty device, the QoE experience indicators of the device internal units of the faulty device may be analyzed to determine the questionable unit. The manner in which the questionable unit is determined may be any manner that is included in FIG. 5A to 5D and in which the QoE experience indicators of the device internal units of the faulty device are analyzed, to determine the questionable unit in the device internal units.

Figure 6B:
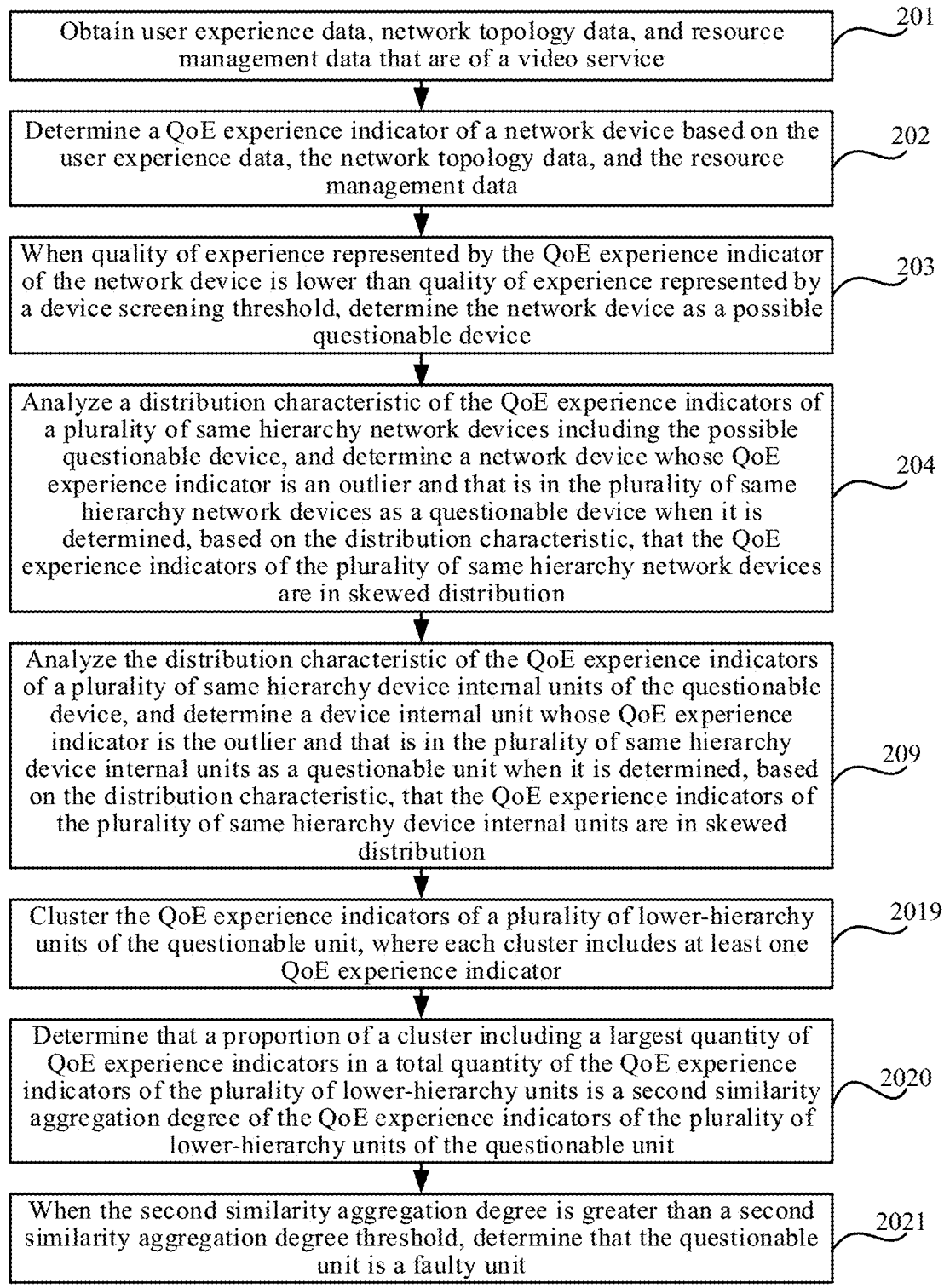
FIG. 6B is a flowchart of another fault localization method according to an embodiment of the present disclosure.

In one example, after the questionable unit is determined, a similarity aggregation degree of a plurality of lower-hierarchy units of the questionable unit may further be analyzed to determine whether the questionable unit is a faulty unit. As shown in FIG. 6B, in addition to steps 201 to 204 and step 209, the method further includes the following steps.

Step 2019: Cluster the QoE experience indicators of a plurality of lower-hierarchy units of the questionable unit, where each cluster includes at least one QoE experience indicator.

Step 2020: Determine that a proportion of a cluster including a largest quantity of QoE experience indicators in a total quantity of the QoE experience indicators of the plurality of lower-hierarchy units is a second similarity aggregation degree of the QoE experience indicators of the plurality of lower-hierarchy units of the questionable unit.

Step 2021: When the second similarity aggregation degree is greater than a second similarity aggregation degree threshold, determine that the questionable unit is a faulty unit.

The manner in which the questionable unit is determined as the faulty unit is similar to the manner in which the questionable device is determined as the faulty device. Details are not described herein again.

Figure 6C:
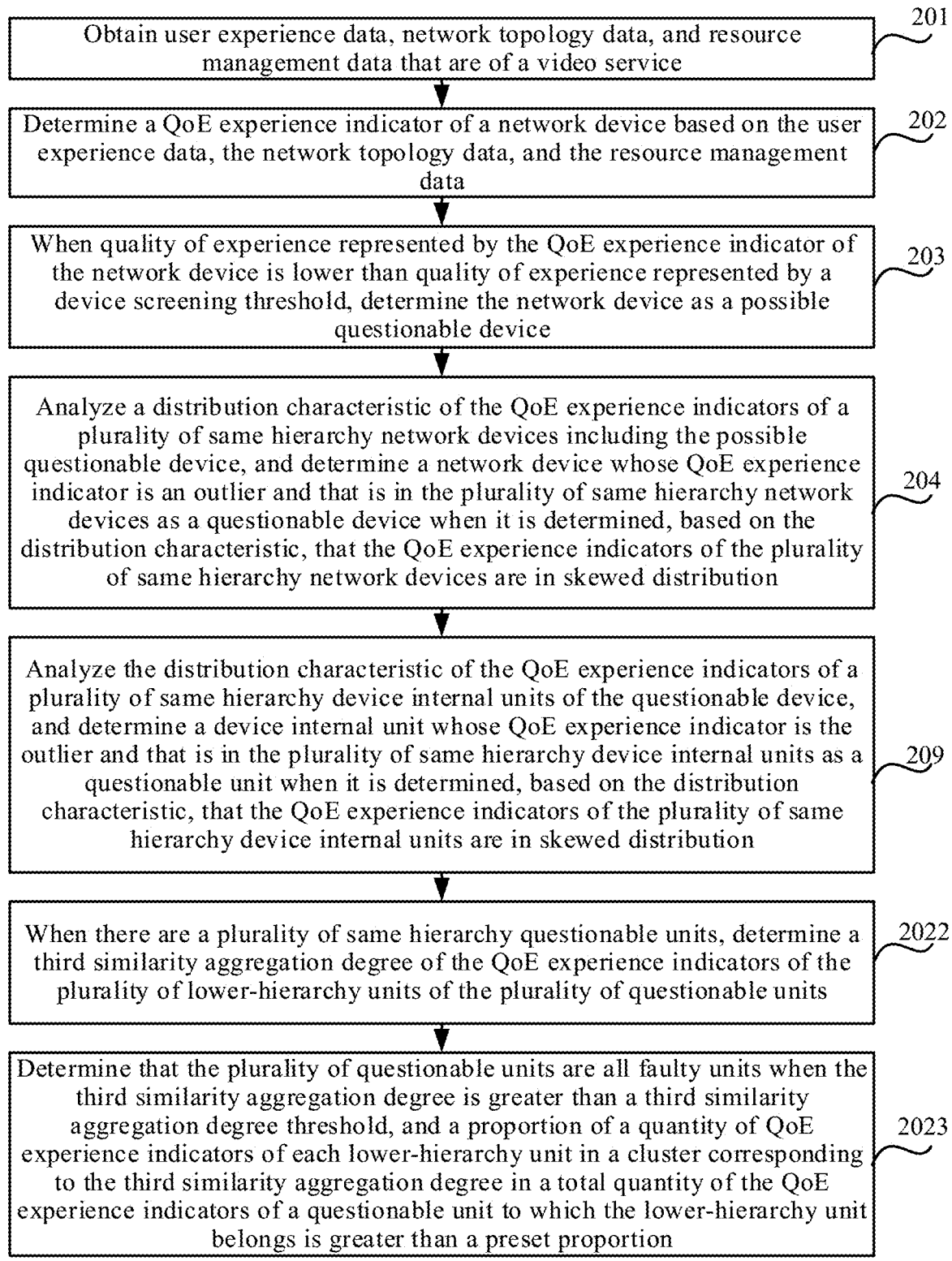
FIG. 6C is a flowchart of another fault localization method according to an embodiment of the present disclosure.

In one example, after the questionable unit is determined, a similarity aggregation degree of a plurality of lower-hierarchy units of a plurality of questionable units may further be analyzed to determine whether the questionable units are faulty units. As shown in FIG. 6C, in addition to steps 201 to 204 and step 209, the method further includes the following steps.

Step 2022: When there is a plurality of same hierarchy questionable units, determine a third similarity aggregation degree of the QoE experience indicators of the plurality of lower-hierarchy units of the plurality of questionable units.

Step 2023: Determine that the plurality of questionable units are all faulty units when the third similarity aggregation degree is greater than a third similarity aggregation degree threshold, and a proportion of a quantity of QoE experience indicators of each lower-hierarchy unit in a cluster corresponding to the third similarity aggregation degree in a total quantity of the QoE experience indicators of a questionable unit to which the lower-hierarchy unit belongs is greater than a preset proportion.

According to this implementation, when a questionable unit is determined as a faulty unit, a joint analysis may be performed on QoE experience indicators of lower-hierarchy units of a plurality of questionable units. For example, a questionable unit 1 has a lower-hierarchy unit 11, a lower-hierarchy unit 12, and a lower-hierarchy unit 13, and a questionable unit 2 has a lower-hierarchy unit 21, a lower-hierarchy unit 22, and a lower-hierarchy unit 23. A similarity aggregation degree of the QoE experience indicator of the lower-hierarchy unit 11, the QoE experience indicator of the lower-hierarchy unit 12, the QoE experience indicator of the lower-hierarchy unit 13, the QoE experience indicator of the lower-hierarchy unit 21, the QoE experience indicator of the lower-hierarchy unit 22, and the QoE experience indicator of the lower-hierarchy unit 23 may be analyzed. If the similarity aggregation degree is greater than a similarity aggregation degree threshold, and a cluster corresponding to the similarity aggregation degree includes the QoE experience indicator of the lower-hierarchy unit 11, the QoE experience indicator of the lower-hierarchy unit 12, the QoE experience indicator of the lower-hierarchy unit 21, the QoE experience indicator of the lower-hierarchy unit 22, and the QoE experience indicator of the lower-hierarchy unit 23. The lower-hierarchy unit 11 and the lower-hierarchy unit 12 belong to the questionable unit 1, and a proportion of a quantity of the QoE experience indicators of the lower-hierarchy unit 11 and the lower-hierarchy unit 12 in a total quantity of the QoE experience indicators of the questionable unit 1 is $2/3$. The lower-hierarchy unit 21, the lower-hierarchy unit 22 and the lower-hierarchy unit 23 belong to the questionable unit 2, and a proportion of a quantity of the QoE experience indicators of the lower-hierarchy unit 21, the lower-hierarchy unit 22, and the lower-hierarchy unit 23 in a total quantity of the QoE experience indicators of the questionable unit 2 is 100%. If a preset proportion is 50%, both $2/3$ and 100% are greater than 50%, it is determined that both the questionable unit 1 and the questionable unit 2 are faulty units.

It may be understood by a person skilled in the art that the foregoing steps may be combined to form a plurality of possible embodiments. For example, one scheme includes steps 201 to 204, and steps 2016 to 2018, that is, the scheme shown in FIG. 6A; another scheme includes steps 201 to 204, and steps 209 to 2011, and the scheme is not shown; another scheme includes steps 201 to 204, step 209, and steps 2019 to 2021, that is, the scheme shown in FIG. 6B; and still another scheme includes steps 201 to 204, and steps 209, 2022, and 2023, that is, the scheme shown in FIG. 6C.

It should be noted that the first and second in the embodiments of the present disclosure are merely used for differentiation, for example, the first similarity aggregation degree threshold and the second similarity aggregation degree threshold may be the same, or may be different.

In this embodiment of the present disclosure, the user experience data, the network topology data, and the resource management data that are of the video service are obtained, so that the QoE experience indicator of the network device can be determined. When the value relationship between the QoE experience indicator of the network device and the device screening threshold meets a preset condition, the network device is determined as a possible questionable device. Compared with a method for locating a fault by monitoring a QoS indicator, this method can better reflect user experience and has higher accuracy. Optionally, a questionable device may further be determined with reference to a distribution characteristic of same hierarchy network devices of the possible questionable device, and/or a similarity aggregation degree analysis is performed on QoE experience indicators of downstream same hierarchy network devices of the possible questionable device or the questionable device, to further determine whether the possible questionable device or the questionable device is faulty, thereby further improving accuracy of fault localization. Optionally, in this embodiment of the present disclosure, only a faulty network device may be located, and a faulty device internal unit in the network device may be further located. Therefore, accuracy of fault localization is high.

A processing procedure of the fault localization method provided in the embodiments of the present disclosure is specifically described below.

Step (1): Obtain user experience data, network topology data, and resource management data, configure a QoE experience indicator, and define an indicator algorithm of the QoE experience indicator.

The user experience data may include at least one of the following items: a vMOS, stalling duration, a stalling proportion, stalling frequency, a blockiness duration proportion, blockiness times, a blockiness area proportion, video quality switch times, and a poor quality proportion of video quality. The network topology data is used to represent a connection relationship between network devices, including a topology connection relationship or a service path of an existing network, and the service path is used to represent a connection relationship between the network devices through which service traffic flows. The resource management data is used to represent a connection relationship between user equipment and the network devices (for example, an OLT). Optionally, the resource management data further includes a connection relationship between the user equipment and each port of the network device.

In one example, an administrator configures the QoE experience indicator as required, and defines the indicator algorithm of the QoE experience indicator. For example, the QoE experience indicator is configured as a poor-QoE rate, a definition of a poor-QoE rate algorithm is used as an example, and a threshold corresponding to each item of data in the user experience data may be used to determine whether a user is a poor-QoE user, thereby collecting statistics on a quantity of poor-QoE users, where the poor-QoE rate is equal to a total quantity of poor-QoE users divided by a total quantity of users. The QoE experience indicator may be but is not limited to the poor-QoE rate. In this embodiment of the present disclosure, the poor-QoE rate is used as an example for description.

In another example, a correspondence among an item included in the user experience data, a QoE experience indicator, and an indicator algorithm of the QoE experience indicator is preset, and the QoE experience indicator and the indicator algorithm of the QoE experience indicator are determined based on an item included in the obtained user experience data. For example, the foregoing correspondence may be shown in but is not limited to Table 1.

TABLE 1

| User experience data | QoE experience indicator | Indicator algorithm of the QoE experience indicator |
| --- | --- | --- |
| vMOS | vMOS average value | vMOS average value is equal to a sum of vMOSs of users divided by a quantity of users |
| Stalling duration, a stalling proportion, and stalling frequency | Poor-QoE rate | Poor-QoE rate is equal to a total quantity of poor-QoE users divided by a total quantity of users |

Table 1 is merely an example, and an actual table may include more correspondences. It may be learned from Table 1 that, when the user experience data includes only the vMOS, it may be determined that the QoE experience indicator is the vMOS average value, and a corresponding indicator algorithm of the QoE experience indicator is: the vMOS average value is equal to a sum of vMOSs of users divided by a quantity of users; when the user experience data includes the stalling duration, the stalling proportion, and the stalling frequency, it may be determined that the QoE experience indicator is the poor-QoE rate, and a corresponding indicator algorithm of the QoE experience indicator is: the poor-QoE rate is equal to a total quantity of poor-QoE users divided by a total quantity of users.

Figure 7:
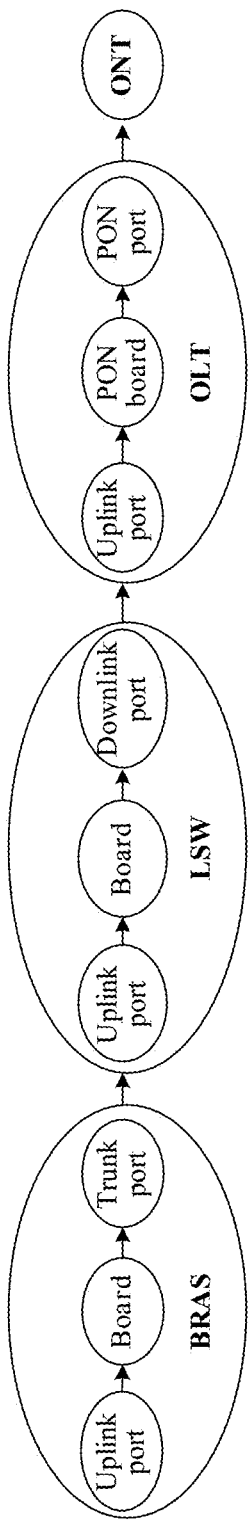
FIG. 7 is a schematic diagram of a device-board-port connection relationship.
Figure 8:
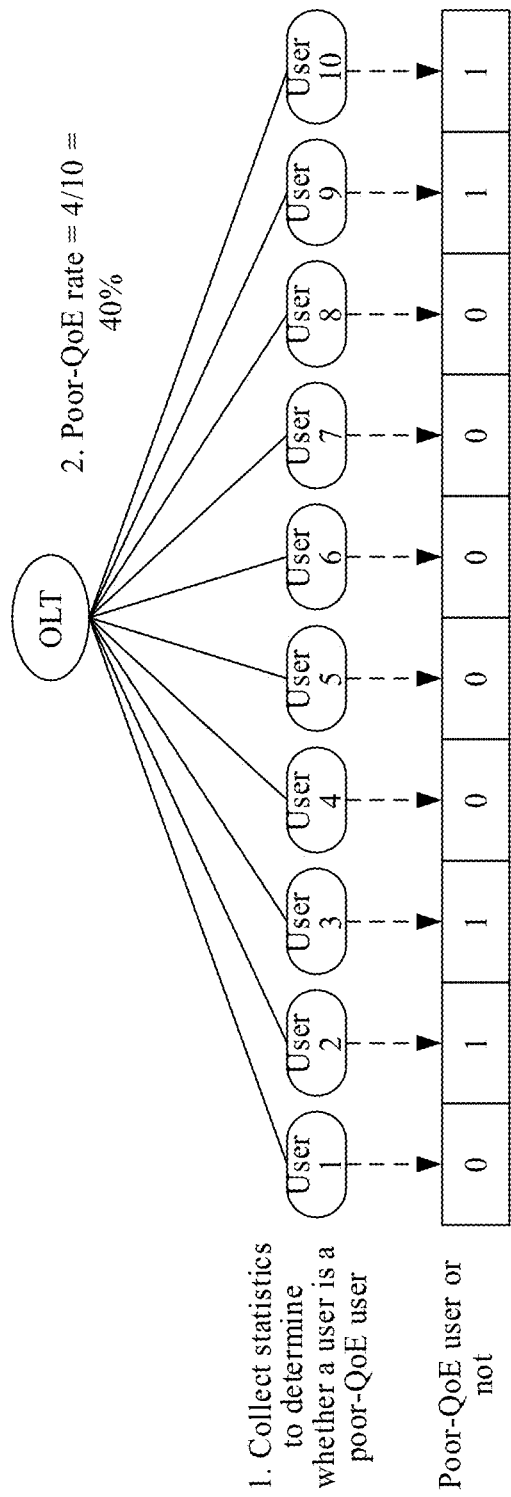
FIG. 8 is a schematic diagram of calculating an OLT poor-QoE rate according to an embodiment of the present disclosure.

Step (2): Refer to a schematic diagram of each device-board-port connection relationship shown in FIG. 7, calculate, based on the user experience data, a poor-QoE rate in each hierarchy based on a device-board-subcard-port-link level and based on the topology connection relationship or the service path of the existing network, and reflect an overall user experience level in each hierarchy by using the poor-QoE rate. The poor-QoE rate is equal to a quantity of all downstream poor-QoE users connected to a device internal unit or a device divided by a quantity of all downstream users connected to the device internal unit or the device. FIG. 8 is a schematic diagram of calculating an OLT poor-QoE rate. Referring to FIG. 8, a total of ten user equipments are located below the OLT, that is, service paths of a total of ten downstream user equipments of the OLT go through the OLT. The first step is to collect statistics to determine whether a user served by the user equipment is a poor-QoE user, 1 is used to represent a poor-QoE user, and 0 is used to represent a non-poor-QoE user. A statistics result shows that there are four poor-QoE users. The second step is to calculate a poor-QoE rate and the poor-QoE rate is 40%.

Figure 9:
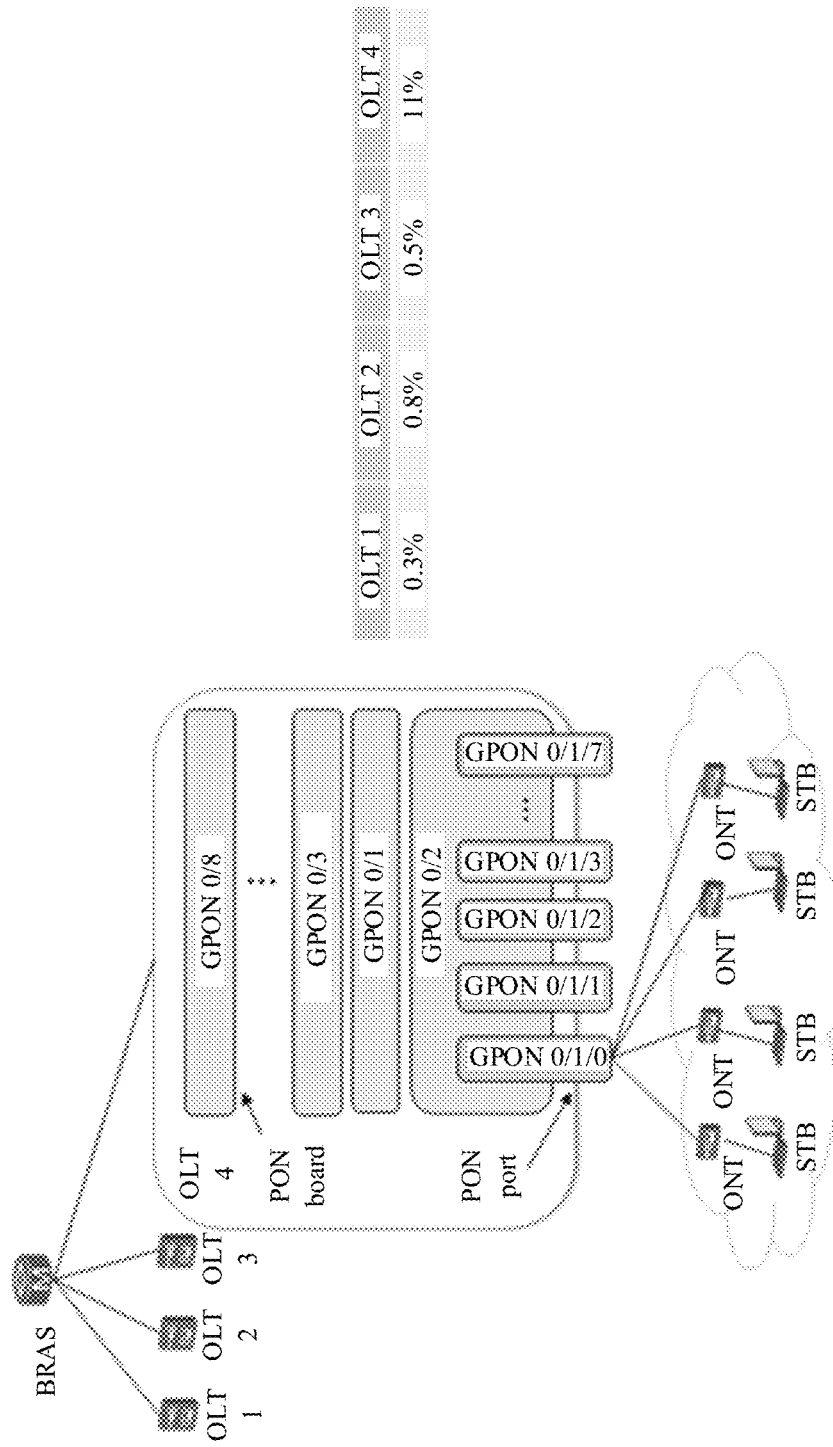
FIG. 9 is a schematic diagram of sifting a possible questionable OLT by using a poor-QoE rate threshold according to an embodiment of the present disclosure.

Step (3): Determine a threshold through threshold learning such as a poor-QoE rate of devices of a same type, that is, determine a device screening threshold, and sift out a possible questionable device based on the device screening threshold for further localization analysis. Optionally, network devices of each type have a device screening threshold. For example, an ONT has a device screening threshold and the OLT has another device screening threshold. FIG. 9 is a schematic diagram of sifting a possible questionable OLT by using a poor-QoE rate threshold. Referring to FIG. 9, OLT devices are used as an example. Poor-QoE rates of four OLTs that are calculated according to the foregoing poor-QoE rate formula are shown in a table in FIG. 9. It is assumed that the poor-QoE rate threshold is 1%, that is, the device screening threshold is 1%. The poor-QoE rate of an OLT 4 exceeds the poor-QoE rate threshold, and the OLT 4 is initially determined as the possible questionable OLT. An equilibrium skew analysis and a similarity analysis are further needed to be performed on the OLT 4. The poor-QoE rates of the remaining OLTs connected to a same BRAS are all relatively low, a problem of the upstream BRAS is excluded, and a fault is located to the OLT 4. It may be understood that the OLT 4 is the possible questionable device, and in view of accuracy of fault localization, possibilities that a device internal unit of the possible questionable device and a downstream device of the OLT 4 are faulty are not excluded.

Step (4): For the sifted possible questionable device, perform statistics and analysis on a distribution characteristic of poor-QoE rates, quantities of online users, and the like of same hierarchy network devices including the possible questionable device, and determine a questionable device. Optionally, statistics and analysis may further be performed on a distribution characteristic of poor-QoE rates of same hierarchy network devices in topology upstream of the possible questionable device; or statistics and analysis may be performed on a distribution characteristic of poor-QoE rates of network devices in topology downstream of the possible questionable device; or statistics and analysis may be performed on a distribution characteristic of poor-QoE rates of device internal units in each hierarchy of the questionable device; or statistics and analysis may be performed on a distribution characteristic of quantities of online users of same hierarchy network devices of the questionable device. A questionable device or a questionable unit is initially located based on an equilibrium skew distribution pattern in a hierarchy. An equilibrium skew analysis may include the following processes.

Step a: Collect statistics on values of data such as the poor-QoE rate and the quantity of online users, where the values of data such as the poor-QoE rate and the quantity of online users may be an average value within a period of time. The average value may be calculated as a mean value, a weighted average value, or the like. In this example, the weighted average value within a one-hour period is calculated as follows:

One-hour poor-QoE rate=$\Sigma_{i=1}^{12}(W_i*X_i/Y_i)$, and $W_i=X_i/\Sigma_{i=1}^{12} X_i$, where i represents $i^{th}$ sampling within one hour, it is assumed that sampling is performed 12 times in the foregoing formula, and i=1 represents the first sampling; $Y_i$ represents a quantity of online users during the $i^{th}$ sampling; $X_i$ represents a quantity of poor-QoE users during the $i^{th}$ sampling; and $W_i$ represents a weight during the $i^{th}$ sampling. It may be understood that the statistical poor-QoE rate in step a is a time average value of poor-QoE rates of a same network device or device internal unit within a period of time, and to distinguish from later-mentioned average values of poor-QoE rates of a plurality of network devices, the time average value of the statistical poor-QoE rate in step a is referred to as a poor-QoE rate for short.

Step b: Analyze a distribution pattern of the poor-QoE rates of same hierarchy network devices, configure corresponding thresholds (such as a coefficient of variation threshold and a poor-QoE rate threshold) based on a requirement, collect statistics on related a distribution characteristic of the poor-QoE rates, such as a coefficient of variation (cv) of the poor-QoE rates and an average value of the poor-QoE rates, and locate a possible questionable device. The coefficient of variation is equal to a standard deviation divided by an average value. That is, a coefficient of variation of the poor-QoE rates of same hierarchy network devices is equal to a standard deviation of the poor-QoE rates of the same hierarchy network devices divided by an average value of the poor-QoE rates of the same hierarchy network devices.

If the coefficient of variation is greater than the coefficient of variation threshold (for example, 0.4), it is considered that the poor-QoE rates of the same hierarchy network devices are in skewed distribution; a skewed device is found, where the skewed device is a network device whose poor-QoE rate is an outlier and that is in the plurality of same hierarchy network devices (for example, when the poor-QoE rate is greater than an average value of poor-QoE rates, the poor-QoE rate is referred to as the outlier), and the skewed device is a questionable device.

If the coefficient of variation is less than or equal to the coefficient of variation threshold, it is considered that the poor-QoE rates of the same hierarchy network devices are in even distribution (non-skewed distribution); if the average value of the poor-QoE rates is relatively high (for example, the average value of the poor-QoE rates is greater than the poor-QoE rate threshold of the network device), it is determined that there is a possible questionable device in upstream network devices.

Optionally, a distribution pattern of poor-QoE rates of same hierarchy device internal units may be analyzed in a same manner as that for analyzing the distribution pattern of the poor-QoE rates of the network devices, to determine the questionable unit.

Figure 10A:
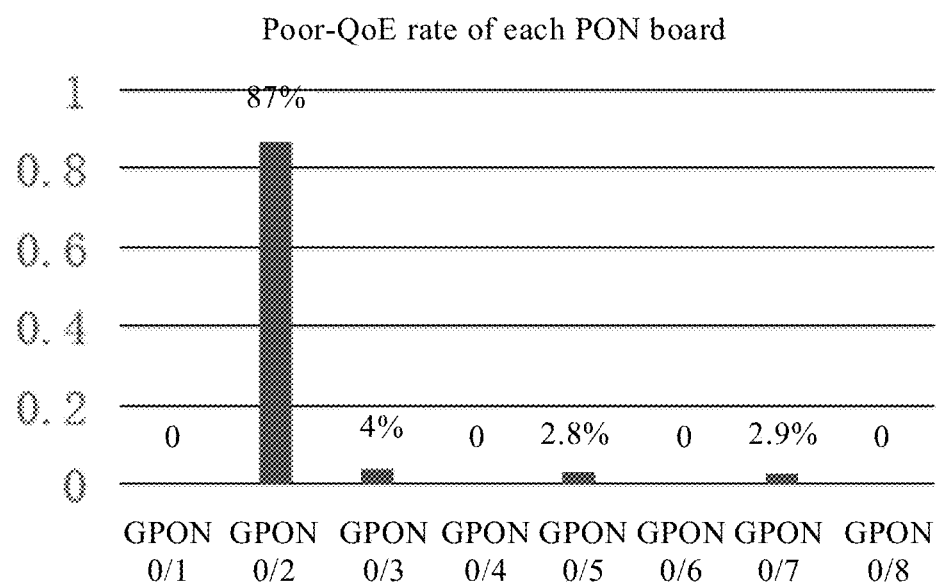
FIG. 10A is a schematic diagram showing distribution of a poor-QoE rate of each PON board of a possible questionable OLT 4 in FIG. 9.

FIG. 10A is a schematic diagram showing distribution of a poor-QoE rate of each PON board of the possible questionable OLT 4 in FIG. 9. After calculation, the coefficient of variation of the poor-QoE rate exceeds the coefficient of variation threshold (for example, 0.4), and it is confirmed that the poor-QoE rates of the PON boards of the possible questionable OLT 4 are in skewed distribution. In addition, the poor-QoE rate (87%) of a PON board 2 (GPON 0/2) far exceeds the average value (12.1%) of the poor-QoE rates, and the PON board 2 (GPON 0/2) is a skewed PON board. In a next step, a quantity of online users of the PON board 2 is further analyzed.

Step c: Analyze a quantity of online users of the questionable device, and compare the quantity of online users of the questionable device with a quantity of online users of all the same hierarchy network devices, for example, calculate a lower confidence limit of distribution of the quantity of online users of all the same hierarchy network devices, to further locate the questionable device. The lower confidence limit is calculated as follows:

$$\text{Lower confidence limit} = \text{mean} - \text{confidence} * \sqrt{\frac{1}{n} * \sum_{i=1}^{n} (x_i - \text{mean})^2},$$

where mean is an average value of the quantity of online users of the same hierarchy network devices, and confidence is a key value corresponding to a confidence interval (that is, a corresponding key value when it is verified that statistical quantities are in standard normal distribution). For example, in this example, a confidence value corresponding to the confidence interval of 80% is 1.28.

If the quantity of online users of the network device is not less than the lower confidence limit, the quantity of online users is considered to be at a normal level.

If the quantity of online users of the network device is less than the lower confidence limit, the quantity of online users is excessively small, and the questionable device is excluded. That is, the questionable device located in step b may be reconfirmed as a normal device based on the quantity of online users in step c.

Optionally, a quantity of online users of the questionable unit may further be analyzed, the quantity of online users of the questionable unit is compared with a quantity of online users of all the same hierarchy device internal units, for example, a lower confidence limit of distribution of the quantity of online users of all the same hierarchy device internal units is calculated, to further locate the questionable unit. The lower confidence limit is calculated as follows:

$$\text{Lower confidence limit} = \text{mean} - \text{confidence} * \sqrt{\frac{1}{n} * \sum_{i=1}^{n} (x_i - \text{mean})^2},$$

where mean is an average value of the quantity of online users of the same hierarchy device internal units, and confidence is a key value corresponding to a confidence interval (that is, a corresponding key value when it is verified that statistical quantities are in standard normal distribution). For example, in the example, a confidence value corresponding to the confidence interval of 80% is 1.28.

If the quantity of online users of the device internal unit is not less than the lower confidence limit, the quantity of online users is considered to be at a normal level.

If the quantity of online users of the device internal unit is less than the lower confidence limit, the quantity of online users is excessively small, and the questionable unit is excluded. That is, the questionable unit located in step b may be reconfirmed as a normal unit based on the quantity of online users in step c.

Figure 10B:
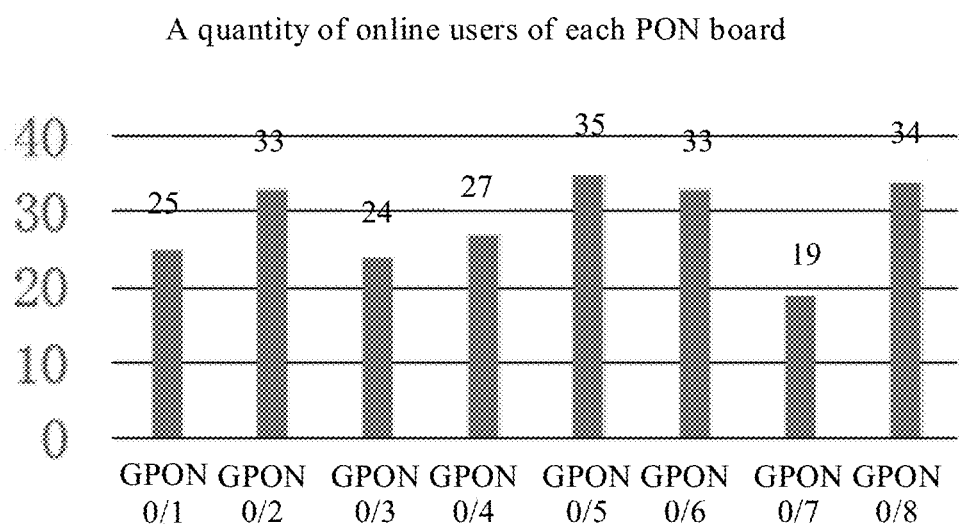
FIG. 10B is a schematic diagram showing distribution of quantities of online users of the PON boards of the possible questionable OLT 4 in FIG. 9.

FIG. 10B is a schematic diagram showing distribution of quantities of online users of the PON boards of the possible questionable OLT 4 in FIG. 9. In the previous step, it is found that the PON board 2 is a skewed PON board, namely, a questionable unit, and the quantity (33) of online users of the PON board 2 is further analyzed. The quantity is greater than a lower confidence limit of a quantity of online users of a same hierarchy PON board (a lower confidence limit corresponding to 80% confidence is 21.71), and it is confirmed that the quantity of online users of the PON board 2 is normal, and the PON board 2 is the skewed PON board, namely, the questionable unit.

Step d: Analyze a distribution pattern of the poor-QoE rates of the lower-hierarchy devices of the questionable device confirmed in step c, and if the poor-QoE rates are evenly distributed and relatively high, further confirm the questionable device, to further analyze similarity of poor quality behaviors of the lower-hierarchy devices of the questionable device; or analyze a distribution pattern of the poor-QoE rates of the lower-hierarchy units of the questionable unit confirmed in step c, and if the poor-QoE rates are evenly distributed and relatively high, further confirm the questionable unit, to further analyze similarity of poor quality behaviors of the lower-hierarchy units of the questionable unit.

In this embodiment of the present disclosure, the skewed device may be understood as a questionable device, and the skewed unit may be understood as a questionable unit.

Figure 11A:
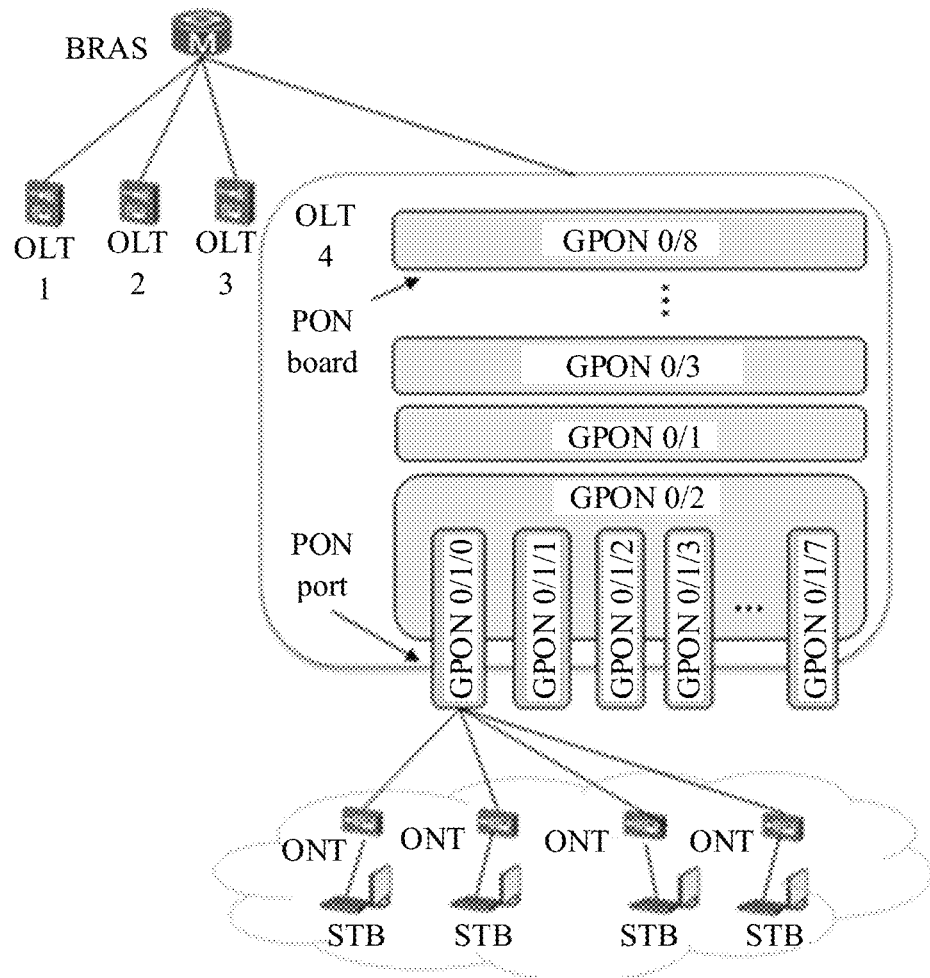
FIG. 11A is a schematic diagram of a connection relationship when a PON board 2 in FIG. 10A is a possible skewed PON board.
Figure 11B:
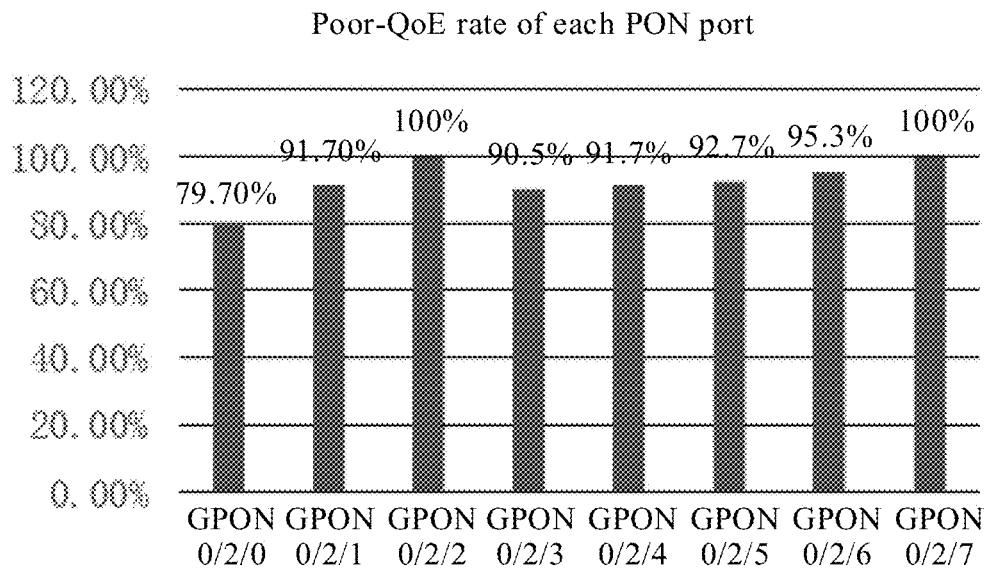
FIG. 11B is a diagram showing distribution of a poor-QoE rate of each PON port of the PON board 2.
Figure 11C:
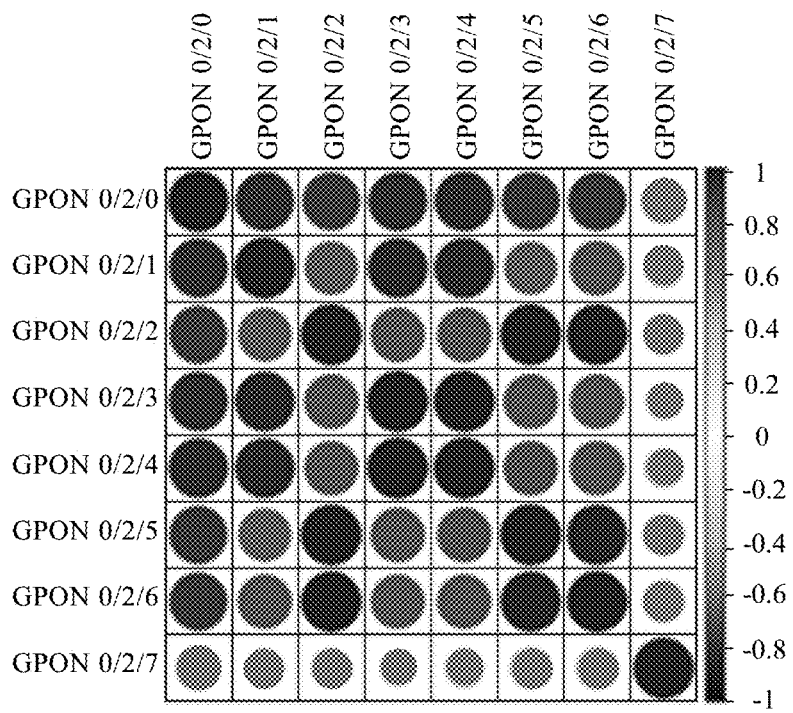
FIG. 11C is a schematic diagram of a poor quality behavior correlation matrix of each PON port of the PON board 2.

FIG. 11A illustrates that the PON board 2 in FIG. 10A is a skewed PON board; FIG. 11B is a diagram showing distribution of a poor-QoE rate of each PON port of the PON board 2; FIG. 11C shows an example of a poor quality behavior correlation matrix of the PON ports of the PON board 2 (a darker color indicates a larger value and higher similarity).

As shown in FIG. 11B, in an example, the poor-QoE rate of each PON port of the PON board 2 is further analyzed, a coefficient of variation of the poor-QoE rates is calculated to be 0.07, which does not exceed the coefficient of variation threshold (for example, 0.4), and it is confirmed that the poor-QoE rates of the PON ports are evenly distributed. An average value (92.7%) of overall poor-QoE rates of the PON ports far exceeds a poor-QoE rate threshold (10%), and it is determined that the poor-QoE rates of the PON ports are evenly distributed and relatively high, and the PON board 2 is a skewed PON board. The similarity of the poor quality behaviors of the PON ports needs to be further analyzed. If the poor quality behaviors of the PON ports are similar, it may be determined that the PON board 2 is questionable, resulting in that all the PON ports are questionable, and the PON board 2 is a faulty PON board. That is, if the poor quality behaviors of the lower-hierarchy units of the questionable unit are similar, it may be further determined that the questionable unit is a faulty unit.

Step (5): Perform a similarity aggregation degree analysis on subnodes of a skewed device (a lower-hierarchy device or a lower-hierarchy user equipment) to further confirm the faulty device. Optionally, a similarity aggregation degree analysis may be further performed on subnodes of a skewed unit (a lower-hierarchy unit or a lower-hierarchy user equipment) to further confirm the faulty unit. Similarity localization analysis enables two functions: (i) A similarity aggregation degree analysis is performed on sub-nodes of a single skewed device or skewed unit by using algorithms such as data mining, to further confirm a faulty device or a faulty unit; and if a similarity aggregation degree is relatively high (for example, greater than a specific threshold), it indicates that poor quality behaviors of the sub-nodes connected to the single skewed device or skewed unit are all basically similar, and it is confirmed that an identified questionable device is a faulty device or that an identified questionable unit is a faulty unit; (ii) A similarity aggregation degree analysis is performed on sub-nodes of a plurality of skewed devices or skewed units, to analyze proportions of similar poor quality behaviors, and if the proportion of similar sub-nodes in each skewed device or skewed unit is relatively high (for example, greater than 50%) in a cluster with a relatively high similarity aggregation degree (for example, greater than a specific threshold), some poor-QoE units or users due to a local fault of a network element may be located, such as a cross-board fault and a cross-board local port fault. A specific analysis may be combined with a correlation coefficient, a data mining clustering algorithm (for example, a density-based spatial clustering of applications with noise (DBSCAN) algorithm), and the like, to calculate a similarity aggregation degree of objects of a skewed device or skewed unit. The analysis in this example includes the following steps.

Step a: Calculate a correlation coefficient of poor-QoE rates between objects to obtain a correlation matrix. A correlation coefficient calculation formula is:

$$\rho(x, y) = \frac{\text{cov}(x, y)}{\sqrt{\text{var}(x)\text{var}(y)}}$$

where cov(x,y) is covariance, and var(x) and var(y) are respectively variance of x and variance of y.

Step b: Cluster the correlation matrix based on that the correlation coefficient is greater than or equal to a specific value (for example, 0.3: moderate or high correlation) and in combination with data mining clustering algorithms such as DBSCAN algorithms, to obtain each cluster including similar objects.

Step c: Calculate a proportion of each cluster, where the proportion of each cluster is equal to a total quantity of objects in the cluster divided by a total quantity of objects.

For example, the total quantity of objects is 10, and two clusters are obtained by using the clustering algorithm in step b. If the total quantity of objects in a cluster is 6, the proportion of the cluster is 60%; a total quantity of objects in the other cluster is 4, and the proportion of the other cluster is 40%. A largest proportion in each cluster is determined as the similarity aggregation degree.

Step d: Determine whether a similarity aggregation degree is greater than a specific threshold, for example, 80%.

FIG. 11C shows a poor quality behavior correlation matrix of the PON ports of the PON board 2, and the poor quality behaviors of the PON ports are in pairwise correlation. In combination with an algorithm such as clustering, the similarity aggregation degree is calculated to be 100%, which exceeds the similarity aggregation degree threshold (80%), and the PON board 2 is confirmed to be questionable, and the fault is finally located to the PON board 2.

Step (6): Determine whether there is an exception by combining a result of an equilibrium skew localization module and a similarity localization module in real time, and if there is an exception, such as a device exception, or a locally serviceable unit such as a board-subcard-port-link-level exception of a device, give an alarm. In this example, it is confirmed that the PON board 2 is abnormal, and an alarm is given.

In this embodiment of the present disclosure, by using the user experience data, the QoE experience indicators are calculated layer by layer by using a topology dimension. This can reflect an overall user experience level and improve accuracy of fault localization. According to a plurality of intelligent methods such as the distribution characteristic and the similarity aggregation degree, a fault is automatically located without manual configuration of the thresholds, and accuracy is high. Experience distribution after aggregation may be monitored in real time to locate a fault. The intelligent methods may be used for device-level fault localization, and may also be used for device-local board-subcard-port-link-level fault localization.

Figure 12:
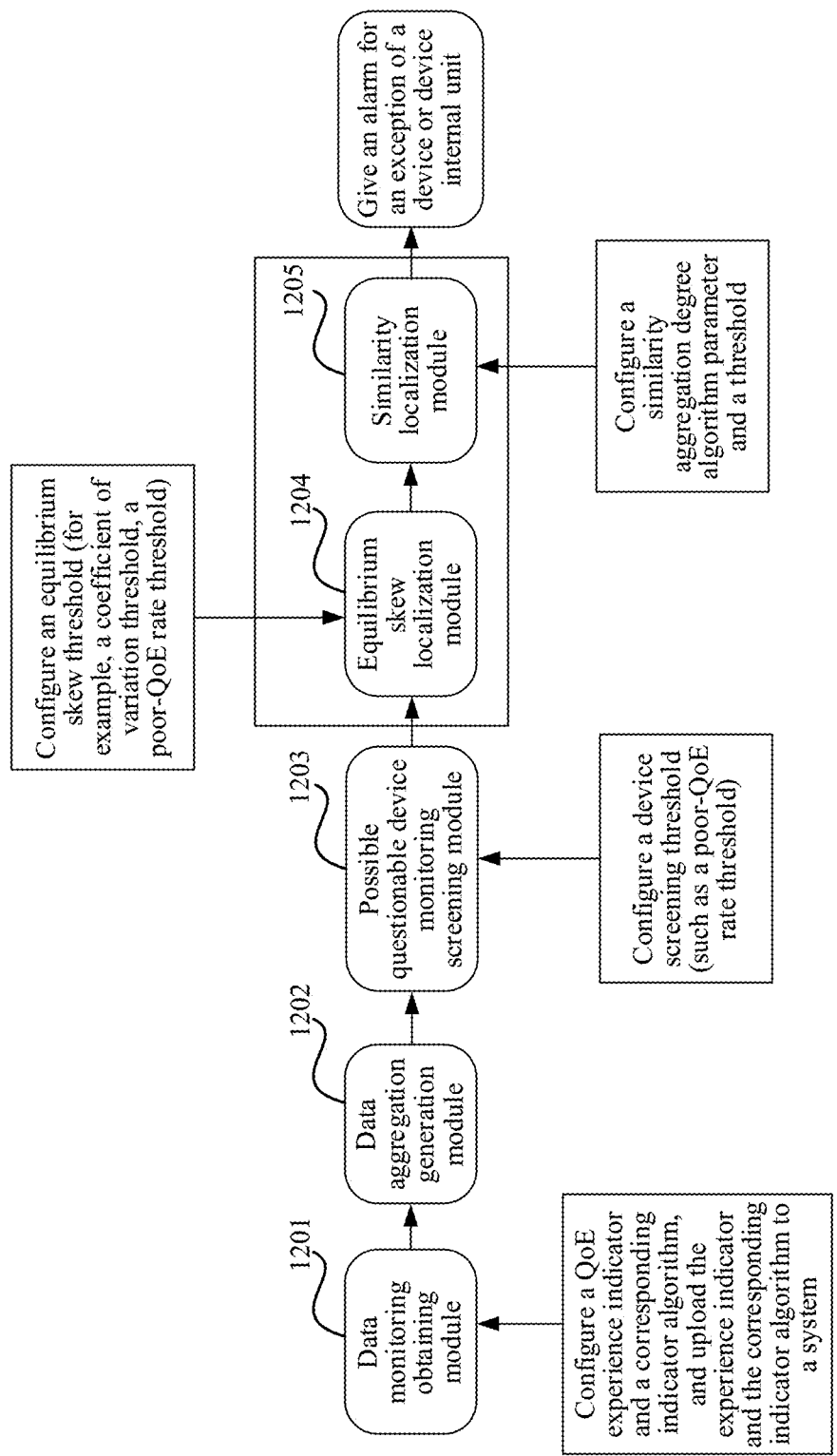
FIG. 12 is a schematic structural diagram of a fault localization device according to an embodiment of the present disclosure.

FIG. 12 is a schematic structural diagram of a fault localization device according to an embodiment of the present disclosure. The device is configured to perform the intelligent group barrier localization method provided in the embodiments of the present disclosure. For corresponding features and descriptions, refer to content related to the foregoing method. Details are not described in this embodiment again. The device includes: a data monitoring obtaining module 1201 configured to monitor user experience data, network topology data, and resource management data that are of IPTV; a data aggregation generation module 1202 configured to determine, based on the user experience data, the network topology data, and the resource management data monitored by the data monitoring obtaining module 1201, a QoE experience indicator in each hierarchy according to a device-board-subcard-port-link hierarchy and based on the QoE experience indicator and an indicator algorithm corresponding to the QoE experience indicator; a possible questionable device monitoring screening module 1203 configured to sift out at least one possible questionable device based on the QoE experience indicator in a device hierarchy that is determined by the data aggregation generation module 1202 and a device screening threshold; and an equilibrium skew localization module 1204 configured to: determine a first distribution characteristic value of the QoE experience indicators that are in the device hierarchy and that are of same hierarchy devices of each possible questionable device sifted out by the possible questionable device monitoring screening module 1203, and initially determine, based on a value relationship between the first distribution characteristic value and an equilibrium skew threshold, that the possible questionable device is a questionable device or that an upstream device of the possible questionable device is a questionable device; and determine a second distribution characteristic value of the QoE experience indicators of device internal units in each hierarchy of each questionable device, and locate at least one questionable device internal unit of each questionable device based on a value relationship between the second distribution characteristic value and the equilibrium skew threshold.

Optionally, the device further includes: a similarity localization module 1205 configured to: after the equilibrium skew localization module 1204 locates the questionable device or the questionable device internal unit, analyze a first similarity aggregation degree of a plurality of lower-hierarchy devices of each questionable device and a second similarity aggregation degree of a plurality of lower-hierarchy units of each questionable device internal unit, to ultimately determine whether the questionable device and the questionable device internal unit are faulty; and/or analyze a third similarity aggregation degree of a plurality of lower-hierarchy units of a plurality of questionable device internal units to ultimately determine whether the plurality of questionable device internal units are faulty.

It may be understood that after the fault localization is completed, an exception alarm of the device or device internal unit may further be given.

In one example, the equilibrium skew localization module 1204 is further configured to: determine the first distribution characteristic value of the QoE experience indicators that are in the device hierarchy and that are of same hierarchy devices of each possible questionable device, and when the first distribution characteristic value is greater than the equilibrium skew threshold, initially determine that a skew device in the same hierarchy devices of the possible questionable device is a questionable device; and when the first distribution characteristic value is less than or equal to the equilibrium skew threshold, initially determine that there is no questionable device in the same hierarchy devices of the possible questionable device; and determine the second distribution characteristic value of the QoE experience indicators of the device internal units in each hierarchy of each questionable device, and when the second distribution characteristic value is greater than the equilibrium skew threshold, initially determine that a skew device internal unit of the device internal units in each hierarchy of the questionable device is a questionable device internal unit; and when the second distribution characteristic value is less than or equal to the equilibrium skew threshold, initially determine that there is no questionable device internal unit in the device internal units in each hierarchy of the questionable device.

In one example, the similarity localization module 1205 is further configured to: determine a first similarity aggregation degree of a plurality of lower-hierarchy devices of each questionable device, and ultimately determine that the questionable device is faulty if a proportion of a cluster whose first similarity aggregation degree is greater than a similarity aggregation degree threshold is greater than a preset proportion; and determine a second similarity aggregation degree of a plurality of lower-hierarchy units of each questionable device internal unit, and ultimately determine that the questionable device internal unit is faulty if a proportion of a cluster whose second similarity aggregation degree is greater than the similarity aggregation degree threshold is greater than a preset proportion; and/or determine a third similarity aggregation degree of a plurality of lower-hierarchy units of a plurality of questionable device internal units, and ultimately determine that the plurality of questionable device internal units are faulty if a proportion of a cluster whose third similarity aggregation degree is greater than the similarity aggregation degree threshold is greater than a preset proportion.

In one example, the user experience data includes at least one of the following items: a VMOS, stalling duration, a stalling proportion, stalling frequency, a blockiness duration proportion, blockiness times, a blockiness area proportion, video quality switch times, and a poor quality proportion of video quality; the network topology data includes a topology connection relationship or a service path of an existing network; the resource management data includes a connection relationship between user equipment and each network device and a connection relationship between the user equipment and each port of the network devices; and the QoE experience indicator is a poor-QoE rate.

An indicator algorithm corresponding to the poor-QoE rate is: the poor-QoE rate is equal to a total quantity of poor-QoE users divided by a total quantity of users. Whether a user corresponding to the user experience data is a poor-QoE user is determined based on a value relationship between the user experience data and an experience threshold.

In one example, the data monitoring obtaining module 1201, the possible questionable device monitoring screening module 1203, the equilibrium skew localization module 1204, and the similarity localization module 1205 may all provide input interfaces for configuring information such as an algorithm and a parameter.

The data monitoring obtaining module 1201 provides an input interface, including collection of a user experience indicator, a network topology, resource management data, and a configured QoE experience indicator (one or more indicators that are used to represent user experience, such as the vMOS and the stalling duration proportion) and a corresponding indicator algorithm, such as a poor-QoE rate, and stores configuration information into a database or a configuration file.

The data aggregation generation module 1202 is configured to: aggregate the poor-QoE rates layer by layer based on the experience data according to a topology or the service path, and according to a device-board-subcard-port-link level, and calculate an overall user experience level in each hierarchy.

The possible questionable device monitoring screening module 1203 is configured to sift out a possible questionable device through threshold learning such as a poor-QoE rate of devices of a same type, so as to further perform a localization analysis on the possible questionable device.

The equilibrium skew localization module 1204 is configured to: perform statistics and analysis on a distribution characteristic of the poor-QoE rates, quantities of online users, and the like, where the poor-QoE rates, the quantities of online users, and the like are those of topology upstream and downstream of the sifted possible questionable device and those of the device internal units in each hierarchy, and initially locate the questionable device or the questionable unit based on an equilibrium skewed distribution pattern in a hierarchy.

The similarity localization module 1205 is configured to perform a similarity aggregation degree analysis on sub-nodes (lower-hierarchy devices or units or users) of a possible faulty network element or a local faulty unit that are located by using equilibrium skew, to further confirm a fault, and locate some poor-QoE units or users due to a local fault of a network element. The similarity localization module enables two functions: (i) A similarity aggregation degree analysis is performed on sub-nodes of a single skewed device or skewed unit by using algorithms such as data mining, to further confirm a fault; and if the similarity aggregation degree is relatively high (for example, greater than a specific threshold), it indicates that poor quality behaviors of the sub-nodes connected to the single skewed device or skewed unit are basically similar, and it is confirmed that the questionable device identified by the equilibrium skew localization module is a faulty device or that the identified questionable unit is a faulty unit; (ii) A similarity aggregation degree analysis is performed on sub-nodes of a plurality of skewed devices or skewed units to analyze a proportion of similar poor quality behaviors, and if the proportion of similar sub-nodes in each skewed device or skewed unit is relatively high (for example, greater than 50%) in a cluster with a relatively high similarity aggregation degree (for example, greater than a specific threshold), some poor-QoE units or users due to a local fault of a network element may be located, such as a cross-board fault and a cross-board local port fault.

Device or device internal unit exception alarm: A poor quality localization system determines whether there is an exception by combining a result of the equilibrium skew localization module and the similarity localization module in real time, and if there is an exception, such as a device exception, or a locally serviceable unit such as a board-subcard-port-link-level exception of the device, gives an alarm.

Figure 13:
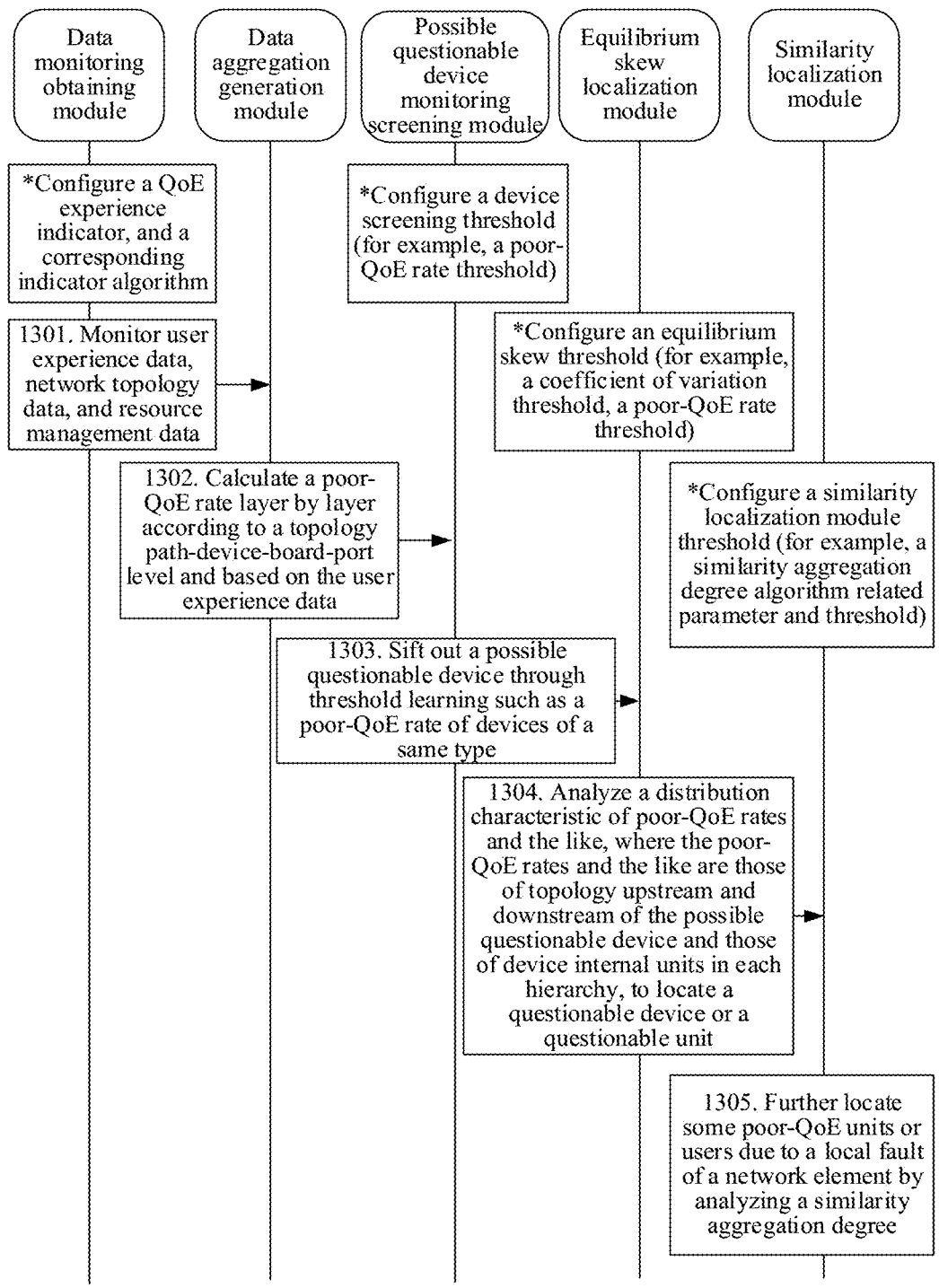
FIG. 13 is a schematic diagram of interaction of each module included in FIG. 12 according to an embodiment of the present disclosure.

Based on the device structure shown in FIG. 12, FIG. 13 is a schematic diagram of interaction of each module according to an embodiment of the present disclosure. Refer to FIG. 13, configuration may be performed on operations labeled with *, and operations labeled with sequence numbers are completed by modules. The operations completed by the modules are described as follows:

Step 1301: Configure a QoE experience indicator and a corresponding indicator algorithm, such as a poor-QoE rate, based on monitored user experience data, network topology data, and resource management data.

In this embodiment of the present disclosure, the QoE experience indicator and the corresponding indicator algorithm may be configured first, and then user experience data, network topology data, and resource management data are monitored; or user experience data, network topology data, and resource management data may be monitored first, and then the QoE experience indicator and the corresponding indicator algorithm are configured based on the monitored user experience data, network topology data, and resource management data.

Step 1302: Based on the user experience data, calculate the poor-QoE rate layer by layer according to a topology path and a device-board-port level, and determine an overall user experience level in each hierarchy.

Step 1303: Configure a device screening threshold (such as a poor-QoE rate threshold), and sift out a possible questionable device through threshold learning such as a poor-QoE rate of devices of a same type, for further localization analysis.

Step 1304: Configure an equilibrium skew threshold (such as a coefficient of variation threshold and a poor-QoE rate threshold), and analyze a distribution characteristic of poor-QoE rates and the like, where the poor-QoE rates and the like are those of topology upstream and downstream of the possible questionable device and those of device internal units in each hierarchy, to locate a questionable device or a questionable unit.

Step 1305: Configure a similarity localization module threshold (such as a parameter and a threshold that are related to a similarity aggregation degree algorithm), and further locate some poor-QoE units or users due to a local fault of a network element by analyzing a similarity aggregation degree.

It may be understood that, to implement the foregoing functions, the fault localization device includes a corresponding hardware structure and/or software module for implementing each function. A person skilled in the art should be easily aware that, the units and algorithm steps in the examples described with reference to the embodiments disclosed in this specification may be implemented by hardware or a combination of hardware and computer software. Whether a function is implemented by hardware or in a manner of driving hardware by a computer software depends on a particular application and a design constraint condition of the technical solution. A person skilled in the art may use different methods to implement the described functions for each particular application, but it should not be considered that the implementation goes beyond the scope of the present disclosure.

In this embodiment of the present disclosure, functional module division may be performed on the device according to the foregoing method examples. For example, each function module can be divided for each function, or two or more functions can be integrated into one processing module. The integrated module may be implemented in a form of hardware, or may be implemented in a form of a functional module of software. It should be noted that, the module division in the embodiments of the present disclosure is an example and is only logical function division. There may be another division manner in actual implementation.

Figure 14:
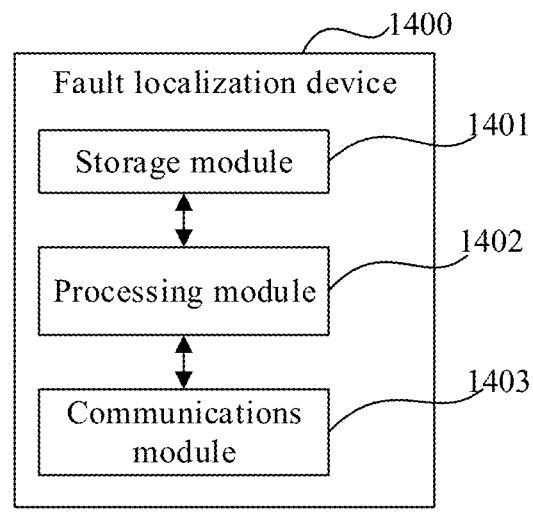
FIG. 14 is a schematic structural diagram of another fault localization device according to an embodiment of the present disclosure.

When an integrated module is used, FIG. 14 is a possible schematic structural diagram of the fault localization device described in the foregoing embodiments. A fault localization device 1400 includes a processing module 1402 and a communications module 1403. The processing module 1402 is configured to control and manage actions of the device. For example, the processing module 1402 is configured to support the device in performing the processes described in FIG. 2, FIG. 3A to FIG. 3D, FIG. 4A to FIG. 4C, FIG. 5A to FIG. 5D, and FIG. 6A to FIG. 6C, and/or performing other processes of the technology described in this specification. The communications module 1403 is configured to support communication between the device and another network entity, such as communication with a network device. The fault localization device may further include a storage module 1401 configured to store program code and data of the device.

Corresponding to FIG. 12, the processing module 1402 may be configured to implement functions of one or more of the data monitoring obtaining module 1201, the data aggregation generation module 1202, the possible questionable device monitoring screening module 1203, the equilibrium skew localization module 1204, and the similarity localization module 1205.

The processing module 1402 may be a processor or a controller, such as a central processing unit (CPU), a general purpose processor, a digital signal processor (DSP), an application-specific integrated circuit (ASIC), a field-programmable gate array (FPGA), or another programmable logic device, a transistor logic device, a hardware component, or any combination thereof. The processor module 1402 can implement or execute various example logical blocks, modules, and circuits that are described with reference to the content disclosed in the present disclosure. The processor may be a combination for implementing a computing function, for example, a combination of one or more microprocessors or a combination of the DSP and a microprocessor, and the like. The communications module 1403 may be a communications interface, a transceiver, a transceiver circuit, or the like. The communications interface is a collective term and may include one or more interfaces. The storage module 1401 may be a memory.

In this embodiment of the present disclosure, the processing module 1402 controls the communications module 1403 to obtain user experience data, network topology data, resource management data that are of a video service, so as to determine a QoE experience indicator of a network device. Because the QoE experience indicator of the network device is determined based on user experience data of user equipment served by the network device. This is different from a manner in which a QoS indicator of the network device is directly determined by obtaining a parameter of the network device. Compared with a method for performing fault localization by monitoring the QoS indicator, this method can better reflect user experience and has high accuracy.

Figure 15:
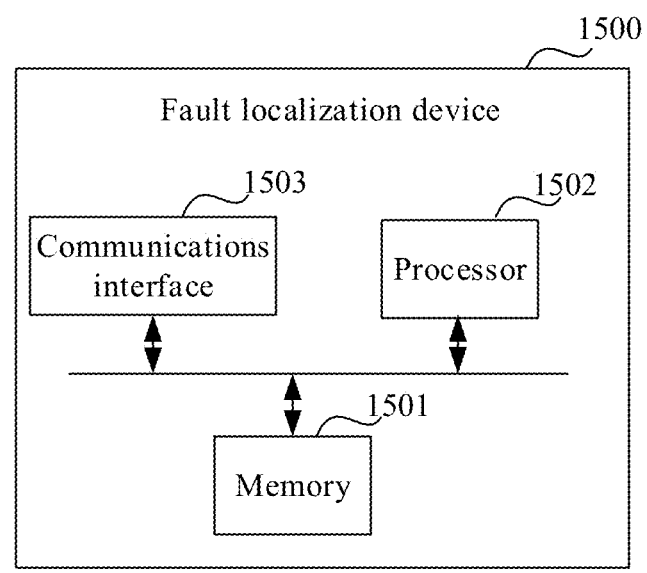
FIG. 15 is a schematic structural diagram of still another fault localization device according to an embodiment of the present disclosure.

When the processing module 1402 is a processor, the communications module 1403 is a communications interface, and the storage module 1401 is a memory, the fault localization device used in the embodiments of the present disclosure may be a device shown in FIG. 15.

As shown in FIG. 15, the fault localization device 1500 includes a processor 1502, a communications interface 1503, and a memory 1501. The communications interface 1503, the processor 1502, and the memory 1501 may be connected to each other by using a communication connection.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a random-access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When this disclosure is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

The invention claimed is:

1. A fault localization method comprising:
obtaining network topology data, resource management data, and user experience data of a video service, wherein the network topology data represent a first connection relationship between network devices, and wherein the resource management data represent a second connection relationship between user equipments (UEs) and the network devices;
determining, from among the UEs and based on the network topology data and the resource management data, one or more UEs served by a first network device;
determining a first quality of experience (QoE) experience indicator of the first network device based on the user experience data of the one or more UEs;
determining the first network device as a possible questionable device according to the first QoE experience indicator;
analyzing a distribution characteristic of same-hierarchy QoE experience indicators of same-hierarchy network devices comprising the possible questionable device; and
determining a second network device that is in the same-hierarchy network devices as a questionable device according to the same-hierarchy QoE experience indicators and a second QoE experience indicator of the second network device.

2. The fault localization method of claim 1, further comprising further determining the first network device as the possible questionable device when a QoE represented by the first QoE experience indicator is lower than a threshold.

3. The fault localization method of claim 2, wherein the first QoE experience indicator is a poor-QoE rate, wherein either the poor-QoE rate is equal to a first total quantity of poor-QoE users of the first network device divided by a second total quantity of users of the first network device or the poor-QoE rate is equal to a third total quantity of poor-QoE users of an internal unit of the first network device divided by a fourth total quantity of users of the internal unit, wherein whether a user corresponding to the user experience data is a poor-QoE user is based on a value relationship between the user experience data and an experience threshold, and wherein the first QoE experience indicator is lower than the threshold when the poor-QoE rate is less than the threshold.

4. The fault localization method of claim 1, further comprising further determining the second network device as the questionable device when the distribution characteristic indicates that the same-hierarchy QoE experience indicators are in a skewed distribution and the second QoE experience indicator is an outlier of the skewed distribution.

5. The fault localization method of claim 1, wherein the user experience data comprise at least one of a video mean opinion score (vMOS), a stalling duration, a stalling proportion, a stalling frequency, a blockiness duration proportion, blockiness times, a blockiness area proportion, video quality switch times, or a poor quality proportion of video quality.

6. The fault localization method of claim 1, wherein the network topology data comprise a topology connection relationship or a service path of an existing network, and wherein the service path represents a third connection relationship between the network devices through which service traffic flows.

7. The fault localization method of claim 1, wherein after determining the second network device as the questionable device, the fault localization method further comprises determining that the second network device is a faulty device according to lower-hierarchy QoE experience indicators of lower-hierarchy devices of the second network device.

8. The fault localization method of claim 7, further comprising:
clustering the lower-hierarchy QoE experience indicators into clusters comprising a first cluster;
determining that a proportion of a quantity of cluster QoE experience indicators of the first cluster to a total quantity of the lower-hierarchy QoE experience indicators is a first similarity aggregation degree of the lower-hierarchy QoE experience indicators; and
further determining that the second network device is the faulty device when the first similarity aggregation degree is greater than a similarity aggregation degree threshold.

9. A fault localization device comprising:
a memory configured to store instructions; and
a processor coupled to the memory and configured to execute the instructions to cause the fault localization device to:
obtain network topology data, resource management data, and user experience data of a video service, wherein the network topology data represent a first connection relationship between network devices, and wherein the resource management data represent a second connection relationship between user equipments (UEs) and the network devices;
determine, from among the UEs and based on the network topology data and the resource management data, one or more UEs served by a first network device;
determine a first quality of experience (QoE) experience indicator of the first network device based on the user experience data of the one or more UEs;
determine the first network device as a possible questionable device according to the first QoE experience indicator;
analyze a distribution characteristic of same-hierarchy QoE experience indicators of same-hierarchy network devices comprising the possible questionable device; and
determine a second network device that is in the same-hierarchy network devices as a questionable device according to the same-hierarchy QoE experience indicators and a second QoE experience indicator of the second network device.

10. The fault localization device of claim 9, wherein the processor is further configured to execute the instructions to cause the fault localization device to further determine the first network device as the possible questionable device when a QoE represented by the first QoE experience indicator is lower than a threshold.

11. The fault localization device of claim 9, wherein the processor is further configured to execute the instructions to cause the fault localization device to further determine the second network device as the questionable device when the distribution characteristic indicates that the same-hierarchy QoE experience indicators are in a skewed distribution and the second QoE experience indicator is an outlier of the skewed distribution.

12. The fault localization device of claim 9, wherein the user experience data comprise at least one of a video mean opinion score (vMOS), a stalling duration, a stalling proportion, a stalling frequency, a blockiness duration proportion, blockiness times, a blockiness area proportion, video quality switch times, or a poor quality proportion of video quality.

13. The fault localization device of claim 9, wherein the network topology data comprise a topology connection relationship or a service path of an existing network, and wherein the service path represents a third connection relationship between the network devices through which service traffic flows.

14. The fault localization device of claim 9, wherein after determining the second network device as the questionable device, the processor is further configured to execute the instructions to cause the fault localization device to determine that the second network device is a faulty device according to lower-hierarchy QoE experience indicators of lower-hierarchy devices of the second network device.

15. The fault localization device of claim 14, wherein the processor is further configured to execute the instructions to cause the fault localization device to:
cluster the lower-hierarchy QoE experience indicators into clusters comprising a first cluster;
determine that a proportion of a quantity of cluster QoE experience indicators of the first cluster to a total quantity of the lower-hierarchy QoE experience indicators is a first similarity aggregation degree of the lower-hierarchy QoE experience indicators; and further determine that the second network device is the faulty device when the first similarity aggregation degree is greater than a similarity aggregation degree threshold.

16. A computer program product comprising instructions that are stored on a non-transitory computer-readable medium and that, when executed by a processor, cause a fault localization device to:

obtain network topology data, resource management data, and user experience data of a video service, wherein the network topology data represent a first connection relationship between network devices, and wherein the resource management data represent a second connection relationship between user equipments (UEs) and the network devices;

determine, from among the UEs and based on the network topology data and the resource management data, one or more UEs served by a first network device;

determine a first quality of experience (QoE) experience indicator of the first network device based on the user experience data of the one or more UEs;

determine that the first network device is a possible questionable device according to the first QoE experience indicator;

analyze a distribution characteristic of same-hierarchy QoE experience indicators of same-hierarchy network devices comprising the possible questionable device; and determine a second network device that is in the same-hierarchy network devices as a questionable device according to the same-hierarchy QoE experience indicators and a second QoE experience indicator of the second network device.

17. The computer program product of claim 16, wherein the user experience data comprise at least one of a video mean opinion score (vMOS), a stalling duration, a stalling proportion, a stalling frequency, a blockiness duration proportion, blockiness times, a blockiness area proportion, video quality switch times, or a poor quality proportion of video quality.

18. The computer program product of claim 16, wherein the network topology data comprise a topology connection relationship or a service path of an existing network, and wherein the service path represents a third connection relationship between the network devices through which service traffic flows.

19. The computer program product of claim 16, wherein after determining the second network device as the questionable device, the instructions, when executed by the processor, further cause the fault localization device to determine that the second network device is a faulty device according to lower-hierarchy QoE experience indicators of lower-hierarchy devices of the second network device.

20. The computer program product of claim 19, wherein the instructions, when executed by the processor, further cause the fault localization device to:

cluster the lower-hierarchy QoE experience indicators into clusters comprising a first cluster;

determine that a proportion of a quantity of cluster QoE experience indicators of the first cluster to a total quantity of the lower-hierarchy QoE experience indicators is a first similarity aggregation degree of the lower-hierarchy QoE experience indicators; and further determine that the second network device is the faulty device when the first similarity aggregation degree is greater than a similarity aggregation degree threshold.

* * * * *